(12) United States Patent
Shikata

(10) Patent No.: US 11,483,470 B2
(45) Date of Patent: Oct. 25, 2022

(54) CONTROL APPARATUS, CONTROL METHOD, AND RECORDING MEDIUM

(71) Applicant: CANON KABUSHIKI KAISHA, Tokyo (JP)

(72) Inventor: Yasushi Shikata, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 16/940,810

(22) Filed: Jul. 28, 2020

(65) Prior Publication Data

US 2021/0044738 A1 Feb. 11, 2021

(30) Foreign Application Priority Data

Aug. 8, 2019 (JP) .............................. JP2019-146278

(51) Int. Cl.
| | |
|---|---|
| *H04N 5/232* | (2006.01) |
| *H04N 5/247* | (2006.01) |
| *G06T 7/80* | (2017.01) |
| *G06T 7/70* | (2017.01) |
| *H04N 13/111* | (2018.01) |

(52) U.S. Cl.
CPC .......... *H04N 5/23218* (2018.08); *G06T 7/70* (2017.01); *G06T 7/80* (2017.01); *H04N 5/232125* (2018.08); *H04N 5/247* (2013.01); *G06T 2207/30204* (2013.01); *G06T 2207/30228* (2013.01); *G06T 2207/30244* (2013.01); *H04N 13/111* (2018.05)

(58) Field of Classification Search
CPC ......... H04N 5/23218; H04N 5/232125; H04N 5/247; H04N 13/111; H04N 5/232; H04N 5/232122; H04N 5/232127; H04N 5/23296; G06T 7/70; G06T 7/80; G06T 2207/30204; G06T 2207/30228; G06T 2207/30244; G06T 7/73
See application file for complete search history.

(56) References Cited

U.S. PATENT DOCUMENTS

| 10,269,141 B1* | 4/2019 | Shotan .................... G06T 5/006 |
| 2013/0222427 A1* | 8/2013 | Heo ....................... G06F 3/0304 |
| | | 345/633 |

FOREIGN PATENT DOCUMENTS

| JP | 2014-215828 A | 11/2014 |
| WO | 17/056757 A1 | 4/2017 |

* cited by examiner

*Primary Examiner* — Mekonnen D Dagnew
(74) *Attorney, Agent, or Firm* — Canon U.S.A., Inc. IP Division

(57) ABSTRACT

A control apparatus configured to control an image-capturing apparatus executes focus adjustment of the image-capturing apparatus in response to detection of a specific marker pattern from an image of an area to be focused by the image-capturing apparatus in an image acquired by image-capturing of the image-capturing apparatus.

21 Claims, 19 Drawing Sheets

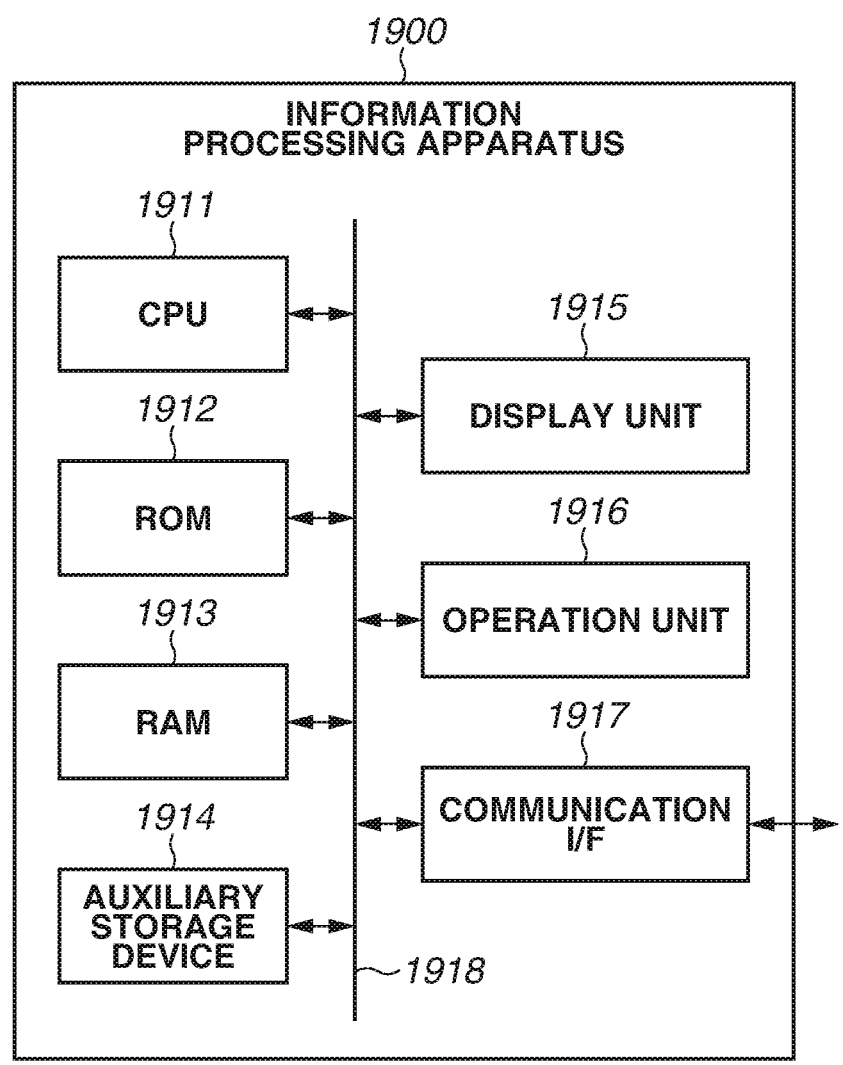

CONTROL APPARATUS, CONTROL METHOD, AND RECORDING MEDIUM

BACKGROUND OF THE DISCLOSURE

Field

The present disclosure relates to a control technique of controlling an image-capturing apparatus.

Description of the Related Art

In recent years, attention has focused on a technique, in which a plurality of image-capturing apparatuses is installed at different positions, the image-capturing apparatuses perform synchronous image-capturing of a subject, and images from a plurality of viewpoints acquired by the image-capturing are used to generate not only images captured from the installation positions of the image-capturing apparatuses but also an image from a freely-selected viewpoint as a virtual viewpoint image. The generation and viewing of the virtual viewpoint image based on the images from the viewpoints can be achieved as follows, for example. First, the image-capturing apparatuses are installed so as to surround the subject, and the images captured by the image-capturing apparatuses are aggregated in an image-generating apparatus, such as a server. The image-generating apparatus then executes processing, such as rendering, based on a virtual viewpoint using the images captured by the image-capturing apparatuses to generate the virtual viewpoint image, and transmits the virtual viewpoint image to a user's viewing terminal. Accordingly, the user's viewing terminal can display the virtual viewpoint image. This technique of generating the virtual viewpoint image enables creation of visually impactful contents from a viewpoint by generating the virtual viewpoint image depending on a viewpoint designated by an image content creator from images captured in, for example, a succor game and a basketball game. The technique also enables the user viewing the contents to move a viewpoint by himself/herself using a controller, a tablet device, or the like mounted on the viewing terminal, and enables the image-generating apparatus to generate the virtual viewpoint image corresponding to the viewpoint. In such a case, the user can watch the game from his/her viewpoint. Service using such a virtual viewpoint image can add realism as if the user were at the scene, as compared to a conventional captured image with which a viewpoint cannot be changed. Japanese Patent Application Laid-Open No. 2014-215828 discusses a technique, in which a plurality of image-capturing apparatuses is installed so as to surround a gaze point, and a virtual viewpoint image from a virtual viewpoint designated by the user is generated using images captured by the image-capturing apparatuses.

In a case where images captured by the image-capturing apparatuses are used to generate the virtual viewpoint image corresponding to a scene that occurs in the vicinity of the gaze point, the image-capturing apparatuses are to have undergone focus adjustment so as to focus on the vicinity of the gaze point. As a method of the focus adjustment, a conceivable method is to execute the focus adjustment of the image-capturing apparatuses using an installed marker such that the image-capturing apparatuses focus on the marker.

However, sufficient time to the focus adjustment may not be allocated due to, for example, constraints of time available to install the marker depending on a subject on which the marker is installed. Thus, there is a demand for executing the focus adjustment of each of the image-capturing apparatuses in a short period of time.

SUMMARY OF THE DISCLOSURE

According to an aspect of the embodiments, a control apparatus configured to control an image-capturing apparatus, the control apparatus includes an identification unit configured to identify an area to be focused by the image-capturing apparatus in an image-capturing target area for which the image-capturing apparatus performs image-capturing, a detection unit configured to detect a specific marker pattern from an image acquired by the image-capturing of the image-capturing apparatus, and an execution unit configured to execute focus adjustment of the image-capturing apparatus in response to the detection of the specific marker pattern from an image of the area that is to be focused by the image-capturing apparatus and has been identified in the acquired image.

Further features of the disclosure will become apparent from the following description of exemplary embodiments with reference to the attached drawings.

BRIEF DESCRIPTION OF THE DRAWINGS

FIG. 19 is a block diagram illustrating a hardware configuration example.

DESCRIPTION OF THE EMBODIMENTS

Exemplary embodiments of the disclosure will be described in detail below with reference to the accompanying drawings. Configurations of the exemplary embodiments described below are mere examples, and the disclosure is not limited to the illustrated configurations.

Figure 1:
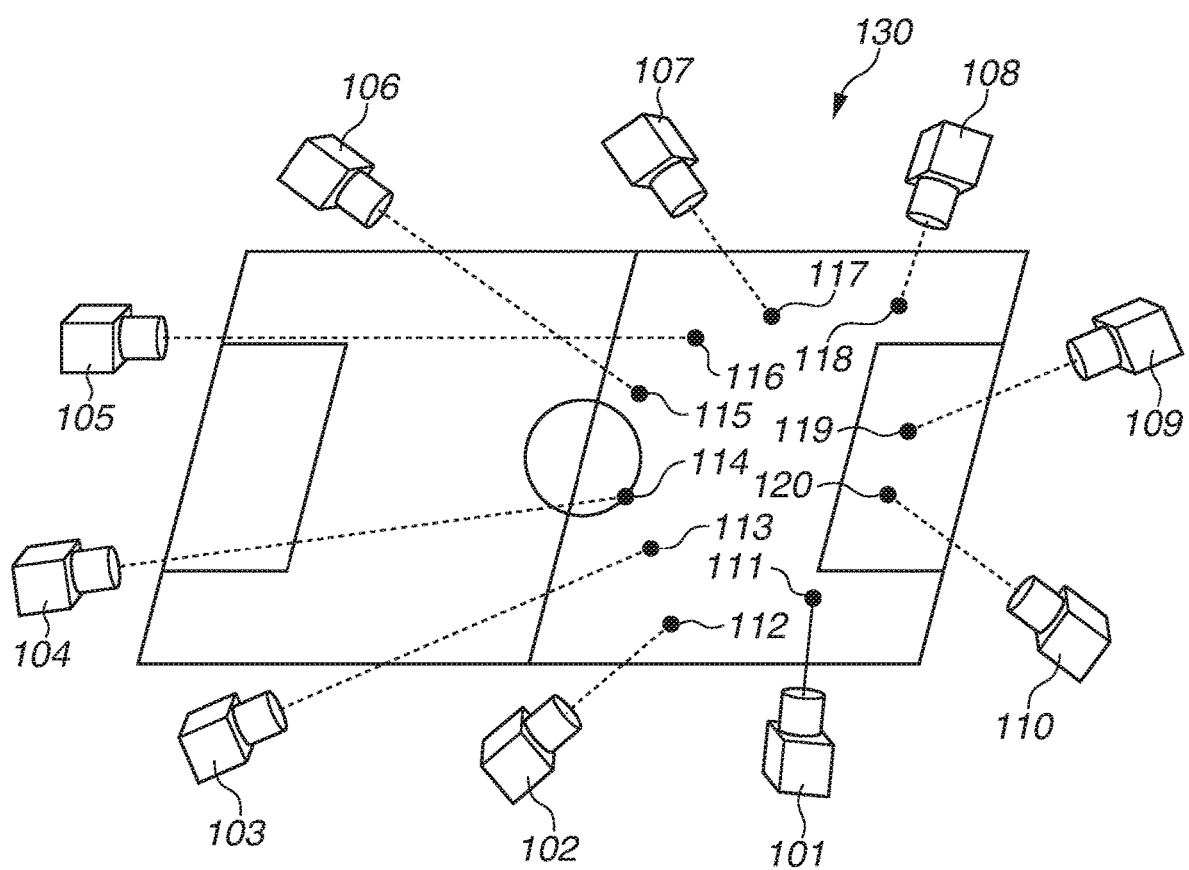
FIG. 1 is a diagram illustrating an arrangement example of a plurality of image-capturing apparatuses and respective gaze points of the image-capturing apparatuses.

A first exemplary embodiment of the disclosure will be described below. FIG. 1 is a diagram schematically illustrating an arrangement example of a plurality of image-capturing apparatuses which are controlled by a control apparatus according to the present exemplary embodiment. As illustrated in FIG. 1, a plurality of image-capturing apparatuses 101 to 110 is installed at mutually different positions. The image-capturing apparatuses 101 to 110 perform synchronous image-capturing of a subject or the like. In the case of the example illustrated in FIG. 1, a field 130 of a succor stadium is set as an image-capturing target area, and the plurality of (ten) image-capturing apparatuses 101 to 110 is arranged so as to surround the field 130. The image-capturing apparatuses 101 to 110 are each provided with an autofocus function, and each capable of remote-controlling a photographing direction, a focal length of a lens, and a focus position.

In the present exemplary embodiment, respective photographing directions of the image-capturing apparatuses 101 to 110 are adjusted such that the image-capturing apparatuses 101 to 110 respectively are pointed in the directions of mutually different gaze points (observation points) 111 to 120. Each gaze point is an intersection point of an optical axis of the corresponding image-capturing apparatus and the field, or a point in the vicinity of the intersection point. The gaze points 111 to 120, at which the image-capturing apparatuses 101 to 110 respectively are directed, may be set in advance as target positions. While the example is illustrated in FIG. 1 in which the image-capturing apparatuses 101 to 110 are respectively pointed in the directions of the mutually different gaze points 111 to 120, groups each including one or more image-capturing apparatuses (image-capturing apparatus group) may be configured to have mutually different gaze points.

In the first exemplary embodiment, a description will be provided of focus adjustment which is executed in each of the image-capturing apparatuses 101 to 110, in a case where the image-capturing apparatuses 101 to 110 have the mutually different gaze points. While the number of image-capturing apparatuses is ten in the example illustrated in FIG. 1, the number is not limited to ten. While the example is illustrated in FIG. 1 in which the gaze points 111 to 120 are arranged on a half side of the field 130, the arrangement is not limited thereto and the gaze points 111 to 120 may be arranged on the whole surface of the field 130. Respective installation positions of the image-capturing apparatuses 101 to 110 are determined by examining each stadium in advance and considering various conditions, such as the absence of obstruction of view of the audience watching a game, an installation interval and an installation method for generating a virtual viewpoint image. For this reason, the installation position of each image-capturing apparatus, a distance from each image-capturing apparatus to the field, and a height from the field to the installation position of each image-capturing apparatus are different for each stadium. A focal length of a lens of each image-capturing apparatus is determined in consideration of, for example, a distance from each image-capturing apparatus to a gaze point, a range in which the virtual viewpoint image is generated, and a resolution of an image of the subject included in the generated virtual viewpoint image.

Figure 2:
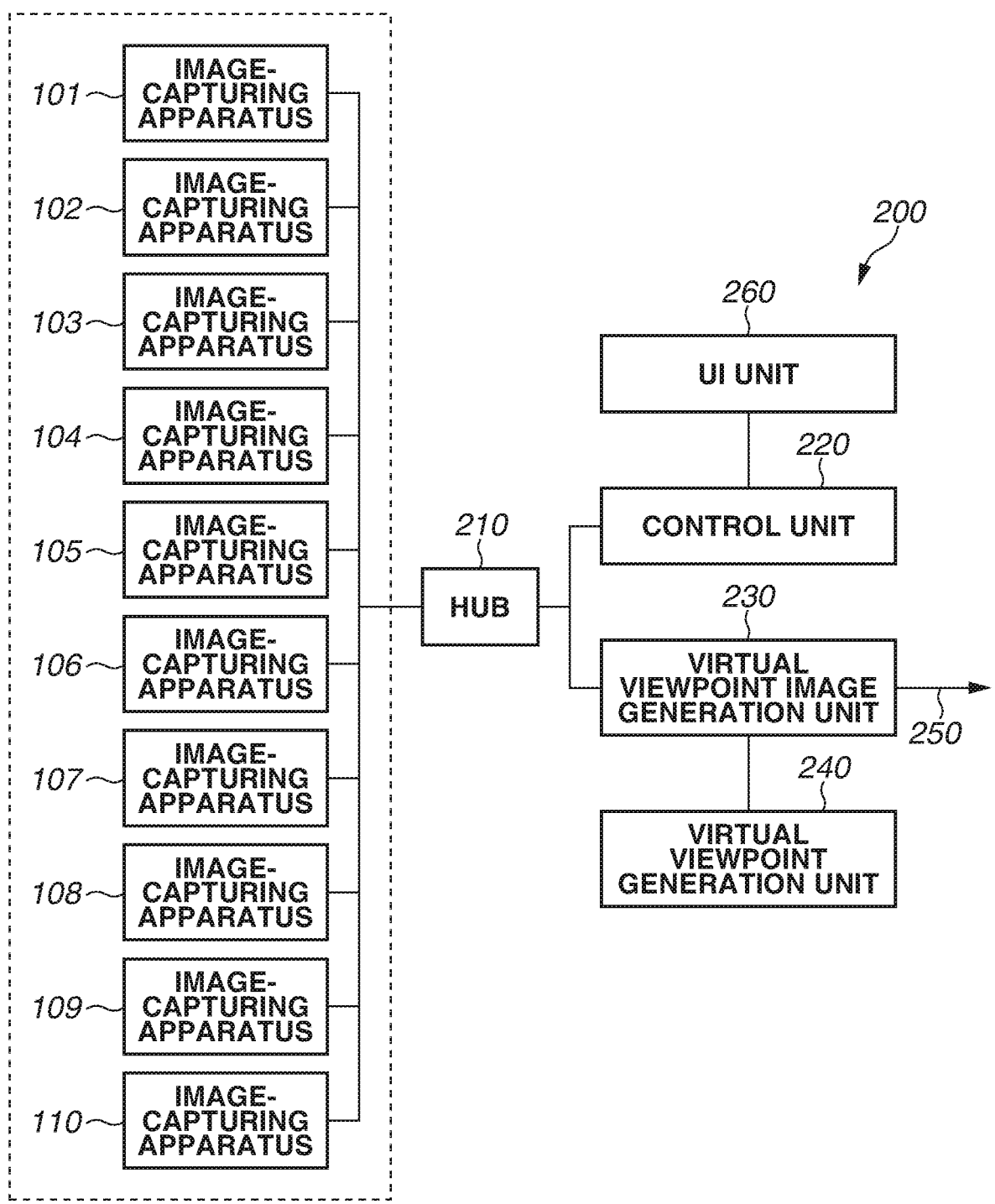
FIG. 2 is a block diagram illustrating a system configuration example.

FIG. 2 is a diagram schematically illustrating a configuration example of a system including the image-capturing apparatuses 101 to 110 illustrated in FIG. 1, a control apparatus 200, and a hub 210 that connects the image-capturing apparatuses 101 to 110 to the control apparatus 200.

The control apparatus 200 according to the present exemplary embodiment has the function of controlling each of the image-capturing apparatuses 101 to 110, and the function of generating the virtual viewpoint image from a freely-selected viewpoint using images from a plurality of viewpoints captured by the image-capturing apparatuses 101 to 110. Data about the images captured by the image-capturing apparatuses 101 to 110 is transmitted through the hub 210 to a virtual viewpoint image generation unit 230 in the control apparatus 200.

The virtual viewpoint image generation unit 230 generates a virtual viewpoint image 250 based on a position and photographing direction of a virtual image-capturing apparatus that are set by a virtual viewpoint generation unit 240. While detailed description is omitted, the virtual viewpoint image generation unit 230 separates the images captured by the respective image-capturing apparatuses into the foreground and the background, generates a three-dimensional (3D) model from the foreground, and render the 3D model with colors viewed from the virtual image-capturing apparatuses, thus generating the virtual viewpoint image. An algorithm to generate the virtual viewpoint image is not limited thereto, and may be a method without generating the 3D model, such as a billboard method.

A user interface (UI) unit 260 is used for an operator to instruct each image-capturing apparatus to perform image-capturing and set the state of each image-capturing apparatus. The UI unit 260 includes a display device that displays an image among other items, and an operation unit that acquires operation information in accordance with an operation performed by the operator. The operator can instruct the image-capturing apparatus to start or end photographing, set a focal length, a shutter speed, an aperture, sensitivity, and a focus position, through the operation on the UI unit 260.

A control unit 220 controls photographing operation, a photographing direction, a focal length, a shutter speed, an aperture, sensitivity, and a focus position with respect to each of the image-capturing apparatus 101 to 110, based on the instructions input by the operator through the UI unit 260.

A system configuration is not limited to the example illustrated in FIG. 2. The image-capturing apparatuses 101 to 110 may be directly connected to the control unit 220 and/or the virtual viewpoint image generation unit 230 without interposing the hub 210. The image-capturing apparatuses 101 to 110 may be daisy-chained.

Figure 3:
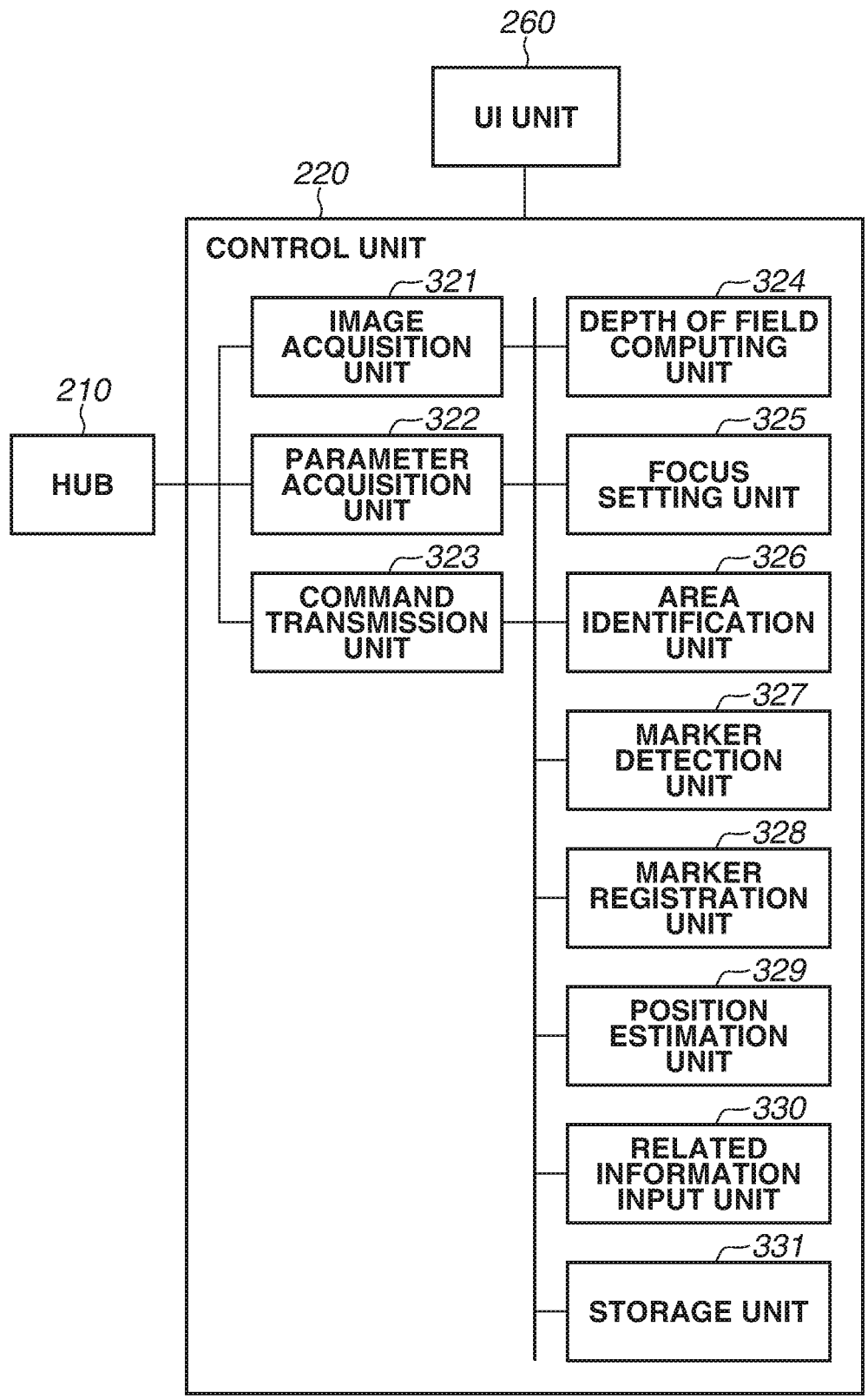
FIG. 3 is a block diagram illustrating a configuration example of a control unit according to a first exemplary embodiment.

FIG. 3 is a diagram illustrating the functions of the control unit 220. FIG. 3 also illustrates the hub 210 and the UI unit 260.

The control unit 220 includes an image acquisition unit 321, a parameter acquisition unit 322, a command transmission unit 323, a depth of field computing unit 324, and a focus setting unit 325. The control unit 220 further includes an area identification unit 326, a marker detection unit 327, a marker registration unit 328, a position estimation unit 329, a related information input unit 330, and a storage unit 331.

The image acquisition unit 321 acquires data about images (i.e., image data about moving images) consecutively captured by each of the image-capturing apparatuses 101 to 110 through the hub 210, and transmits the data to the area identification unit 326, the position estimation unit 329, the marker detection unit 327, the storage unit 331, and the UI unit 260.

As described above, the UI unit 260 displays the images from the image-capturing apparatuses 101 to 110 on the display device, and acquires operation information in accordance with an operation performed by the operator through the operation unit. The operator can set, for example, an angle of view, a photographing direction, or exposure based on an aperture value for a desired image-capturing apparatus by operating the operation unit while watching the images from the image-capturing apparatuses 101 to 110, and adjust the desired image-capturing apparatus. The operator can visually check the focus state of each image-capturing apparatus based on an image displayed on the display device of the UI unit 260. Further, through operation on the UI unit 260, the operator can not only operate each of the image-capturing apparatuses 101 to 110, but also operate each image-capturing apparatus of each group including one or more image-capturing apparatuses, or collectively operate all the image-capturing apparatuses.

The parameter acquisition unit 322 acquires photographing parameters from each of the image-capturing apparatuses 101 to 110 through the hub 210. The photographing parameters are current information with respect to each of the image-capturing apparatuses 101 to 110 about a zoom value, an aperture value, an exposure value, a focus value, and at which position in the screen the focus or exposure is adjusted. These photographing parameters are also information indicating the state of each of the image-capturing apparatuses 101 to 110 at the time of image-capturing.

The marker detection unit 327 detects a specific marker pattern, which will be described below, from the captured images acquired by the image acquisition unit 321, and identifies coordinates of the maker pattern in the image. The marker pattern will be described in detail below.

One or more marker pattern images or feature amounts of the marker pattern images are registered (stored) in the marker registration unit 328. The marker registration unit 328 stores the marker pattern images or information about the feature amounts in a hard disk or a semiconductor memory. The marker pattern images or the information about the feature amounts registered in the marker registration unit 328 may be prepared in advance, or acquired from, for example, an external apparatus.

The storage unit 331 stores part or all of the images acquired by the image acquisition unit 321. The storage unit 331 also stores information about the above-described photographing parameters of the corresponding image-capturing apparatus that has captured the stored image in association with the stored image. The images and the photographing parameters stored in the storage unit 331 can be displayed on the display device of the UI unit 260. In a case where the images captured at the time of focus processing or the like executed in the image-capturing apparatuses 101 to 110 and the information about the photographing parameters are displayed on the display device of the UI unit 260, the operator can visually check the state of each image-capturing apparatus. That is, the operator can visually check the state of the image captured by each image-capturing apparatus, and the state of each image-capturing apparatus, such as a focus value, a focus state at an in-focus position in the image, a zoom value, an aperture value, and an exposure value.

The depth of field computing unit 324 computes a depth of field at the in-focus position for each of the image-capturing apparatuses 101 to 110 based on the photographing parameters acquired by the parameter acquisition unit 322 from the image-capturing apparatuses 101 to 110.

The related information input unit 330 acquires and holds information about the geometry of the stadium from the outside. The information about the geometry of the stadium is information including 3D geometric model data of the stadium and 3D coordinate information indicating the position and size of the field 130 in the stadium. In the following description, these pieces of information are collectively referred to as stadium-related information. The related information input unit 330 holds the stadium-related information by storing the information in a hard disk or a semiconductor memory.

The position estimation unit 329 estimates, for each of the image-capturing apparatuses 101 to 110, a relative position of the corresponding image-capturing apparatus to the field 130, and a relative orientation of each of the corresponding image-capturing apparatuses 101 to 110 to the field 130. The position estimation unit 329 estimates the relative position and relative orientation of each image-capturing apparatus to the field 130 based on the stadium-related information held by the related information input unit 330, and the captured image acquired by the image acquisition unit 321 from each of the image-capturing apparatuses 101 to 110.

The area identification unit 326 identifies an area on which each image-capturing apparatus should focus from the image acquired from the image acquisition unit 321, the relative position of each of the image-capturing apparatuses 101 to 110 to the field 130. The area on which each image-capturing apparatus should focus will be described below. The relative position is estimated by the position estimation unit 329 described above.

The focus setting unit 325 sets the in-focus position within the angle of view of each image-capturing apparatus, i.e., within an area in which each image-capturing apparatus performs the image-capturing at a freely-selected position. The focus setting unit 325 can set, as the in-focus position, not only a position at the center of the angle of view (center of area in which image-capturing apparatus performs image-capturing) but also a position outside the center of the angle of view. In the case of the present exemplary embodiment, the focus setting unit 325 sets, for an image-capturing apparatus, an area that has been identified by the area identification unit 326 as the area to be focused on, as the in-focus position of the image-capturing apparatus in the field 130 serving as the image-capturing target area. The area that is identified as the area to be focused on will be described below. The focus setting unit 325 sets the area identified as the area to be focused on for each of the image-capturing apparatuses 101 to 110 as the in-focus position of the corresponding image-capturing apparatus.

The command transmission unit 323 generates various types of commands related to photographing control, and transmits these commands to each of the image-capturing apparatuses 101 to 110 through the hub 210. In the case of the present exemplary embodiment, the command transmission unit 323 generates commands that provide instructions to, for example, start or end photographing, make a zoom setting, and set an aperture value, and a command related to focus processing. The command transmission unit 323 then transmits the commands to the image-capturing apparatuses 101 to 110. In the case of the present exemplary embodiment, the command related to the focus processing includes commands that instruct each image-capturing apparatus, for example, to start, interrupt, and end the focus processing, the in-focus position of each image-capturing apparatus on the screen. The actual focus processing is executed by the image-capturing apparatus.

In the case of the present exemplary embodiment, the focus adjustment of each of the image-capturing apparatuses 101 to 110 is executed in the area identified by the area identification unit 326 as the area to be focused on. The area identified as the area to be focused on will be described below.

First, an amount of blur produced by a lens of the image-capturing apparatus (camera) will be described.

Figure 4:
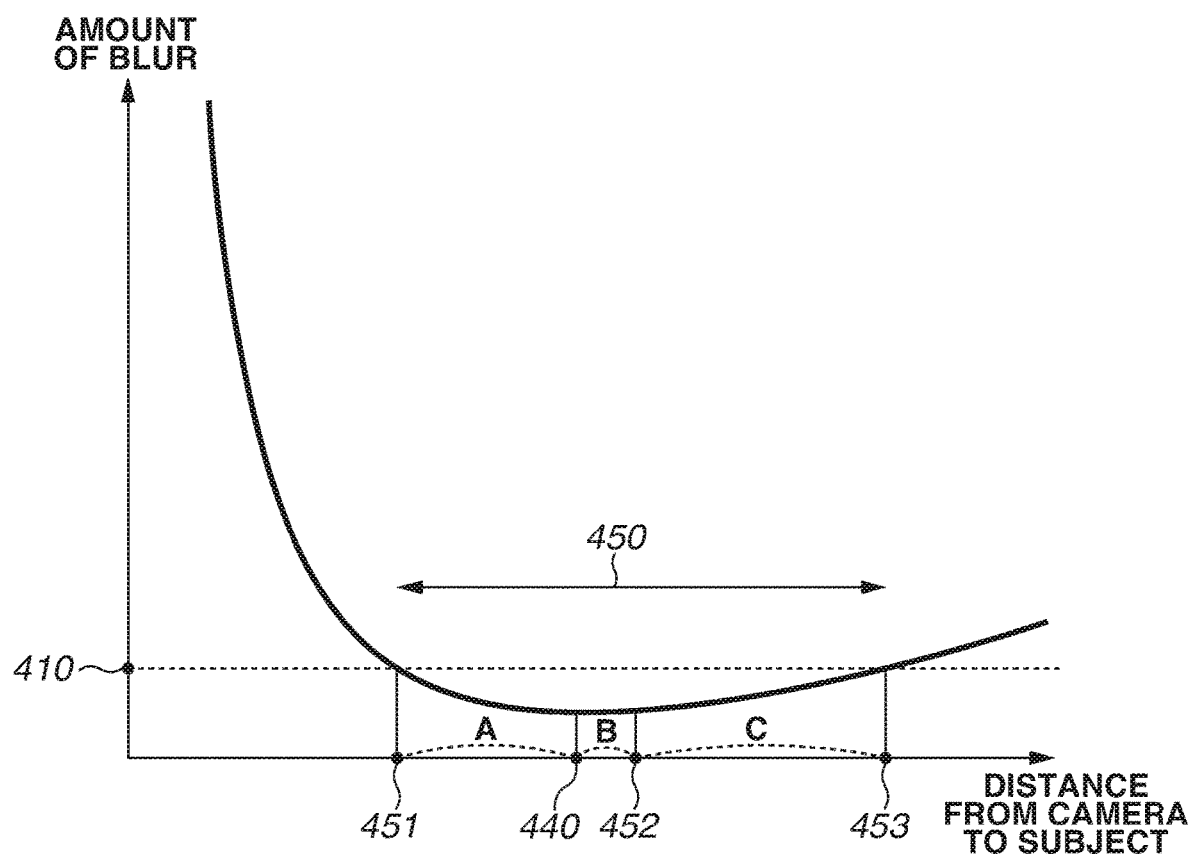
FIG. 4 is a diagram illustrating a relationship between a distance to a subject and an amount of blur.

FIG. 4 is a diagram illustrating a relationship between a distance from the image-capturing apparatus to the subject and an amount of blur with a certain aperture value and a focus value. The image-capturing apparatus is assumed to focus on an in-focus point 440 at the position of the subject. The "in-focus" is assumed to be the same in meaning as focus. At this time, the amount of blur sharply increases as the subject approaches the front side (image-capturing apparatus side) from the in-focus point 440. In contrast, the amount of blur increases little by little as the subject moves away from the in-focus point 440 toward the far side (rear side). When an amount of blur that cannot be visually recognized by humans is defined as an amount of blur 410 based on the depth of field and the resolution of a human eye, a range, in which the image-capturing apparatus can be regarded as being in an in-focus state, can be represented as an in-focus range 450. When a distance from the in-focus point 440 to a front end 451 of the in-focus range 450 is a distance A and a distance from the in-focus point 440 to a rear end 453 of the in-focus range 450 is a sum of a distance B and a distance C, a center 452 of the in-focus range 450 is on the rear side of the in-focus point 440. A sum of the distance A and the distance B is equal to the distance C.

Figure 5:
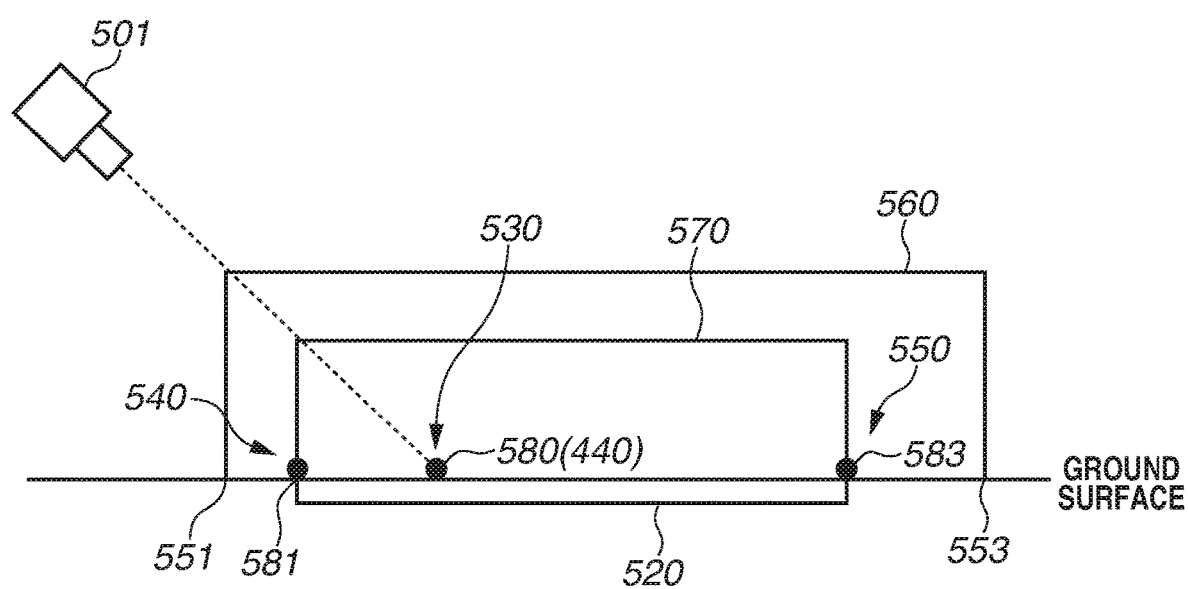
FIG. 5 is a diagram illustrating an example of focus adjustment.

FIG. 5 is a diagram used for illustrating focus adjustment of an image-capturing apparatus 501, which is any one of the image-capturing apparatuses 101 to 110. In an example illustrated in FIG. 5, the image-capturing apparatus 501 is assumed to focus on a gaze point 580 (i.e., gaze point 580 corresponds to in-focus point 440). An in-focus range 560 is a range in which the image-capturing apparatus 501 can be regarded as being in the in-focus state like the in-focus range 450 illustrated in FIG. 4, and a front end 551 corresponds to the front end 451 illustrated in FIG. 4 and a rear end 553 corresponds to the rear end 453 illustrated in FIG. 4. A field 520 corresponds to the field 130 illustrated in FIG. 1.

The example illustrated in FIG. 5 indicates a case in which the in-focus range 560 is larger than the field 520. When the in-focus range 560 is larger than the field 520 as just described, the front end 551 and rear end 553 of the in-focus range 560 are outside the field 520. In such a case, an area in which the in-focus state is to be guaranteed and is to be generated the virtual viewpoint image (in-focus guarantee area 570) is an area from a field end (front end 581) close to the image-capturing apparatus 501 to a field end (rear end 583) far from the image-capturing apparatus 501.

Figure 6:
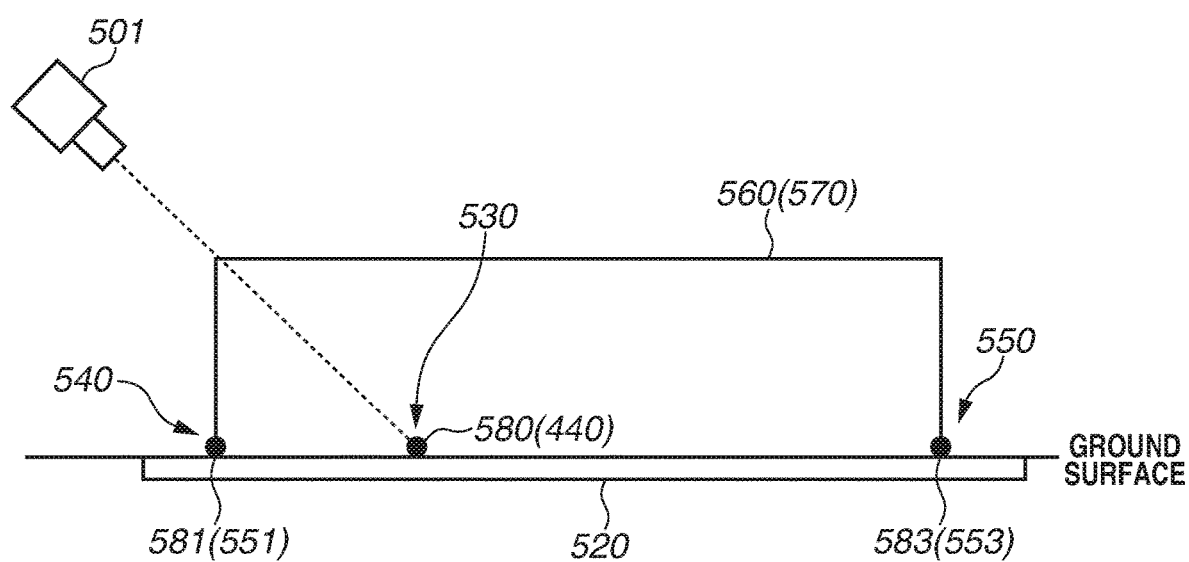
FIG. 6 is a diagram illustrating another example of focus adjustment.

FIG. 6 is another diagram illustrating the focus adjustment of the image-capturing apparatus 501, in a manner similar to the example illustrated in FIG. 5. Note that FIG. 6 illustrates a case in which the field 520 is larger than the in-focus range 560, i.e., the in-focus range 560 is smaller than the field 520. As illustrated in the example in FIG. 6, when the field 520 is larger than the in-focus range 560, the front end 551 and rear end 553 of the in-focus range 560 are inside the field 520. In the case of the example illustrated in FIG. 6, the in-focus guarantee area 570 in which the in-focus state is to be guaranteed is the same as the area indicated by the in-focus range 560. That is, in the case of the example illustrated in FIG. 6, the front end 581 of the in-focus guarantee area 570 coincides with the front end 551 of the in-focus range 560, and the rear end 583 of the in-focus guarantee area 570 coincides with the rear end 553 of the in-focus range 560.

The focus adjustment of the image-capturing apparatus 501 is to be performed at least at the gaze point 580 and in an area in the vicinity of the gaze point 580 (referred to as gaze point area 530). In addition, in the case of the present exemplary embodiment, the focus adjustment of the image-capturing apparatus 501 is performed also in an area including the front end 581 of the in-focus guarantee area 570 (referred to as front area 540) and an area including the rear end 583 of the in-focus guarantee area 570 (referred to as rear area 550). In the case of the present exemplary embodiment, the area identification unit 326 identifies, for each of the image-capturing apparatuses 101 to 110, each of the gaze point area 530, the front area 540, and the rear area 550 as the area to be focused on in the image captured by the corresponding image-capturing apparatus.

Figure 7:
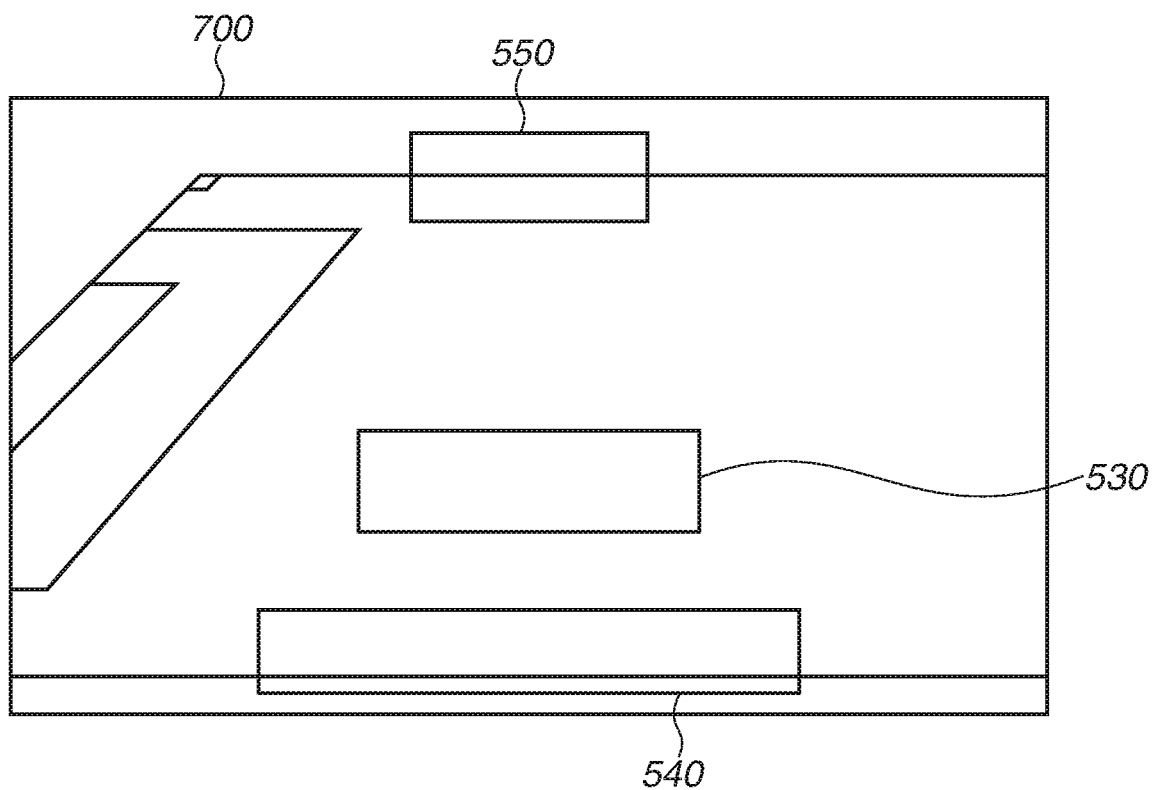
FIG. 7 is a diagram illustrating an example in which areas to be focused on is clearly specified on a screen.

FIG. 7 is a diagram illustrating an example of a captured image display screen 700 in a case where the image captured by an image-capturing apparatus 501, which is any one of the image-capturing apparatuses 101 to 110, is displayed on the display device of the UI unit 260. In a case where the gaze point area 530, the front area 540, and the rear area 550, which have been identified by the area identification unit 326 as the areas to be focused on, are displayed on the captured image display screen 700, the captured image display screen 700 displays a captured image as illustrated in FIG. 7. While the example of the captured image display screen 700 of one image-capturing apparatus 501 is illustrated in FIG. 7, the gaze point area, the front area, and the rear area are different for each of the image-capturing apparatuses 101 to 110.

To perform the focus adjustment of the image-capturing apparatus 501 in the gaze point area 530 or the like, a positional relationship in the 3D coordinate space of the field 130 among the position and orientation of the image-capturing apparatus 501, the gaze point 580, and the in-focus guarantee area 570 is to be determined.

Figure 8:
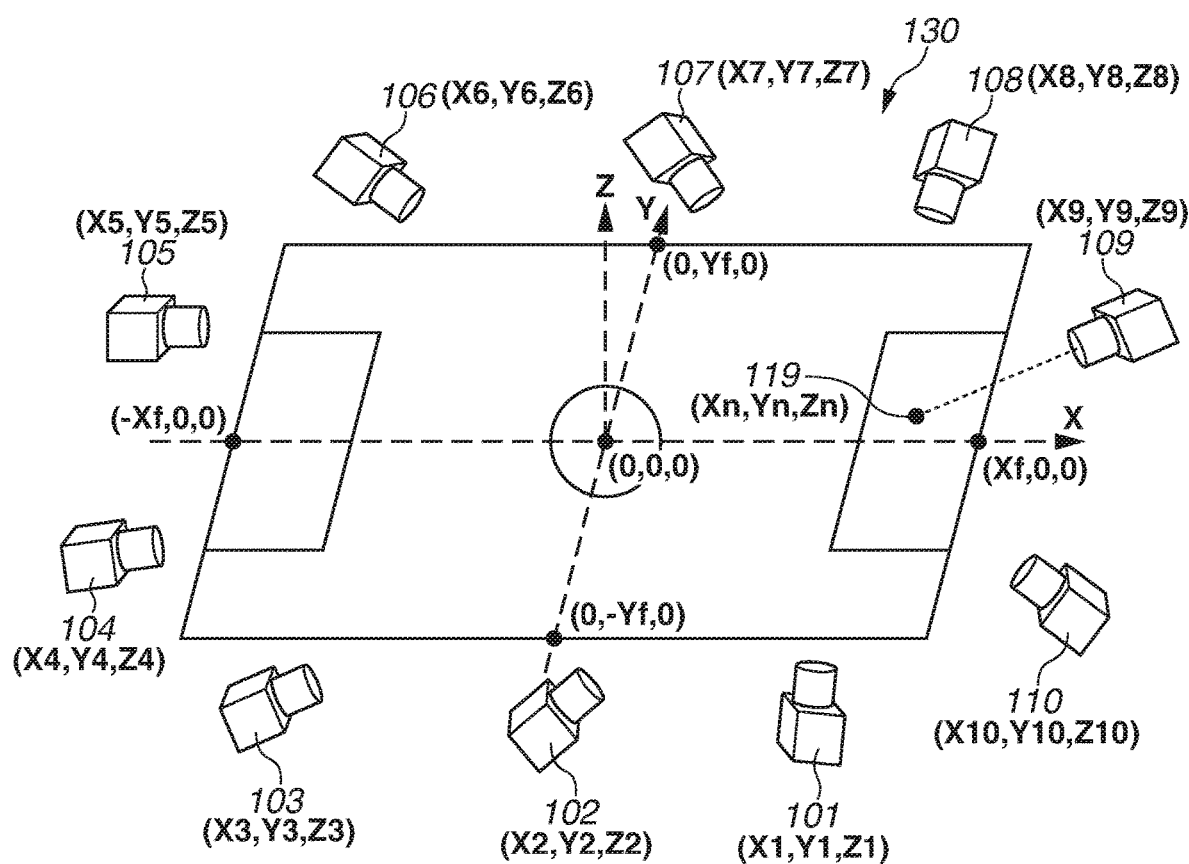
FIG. 8 is a diagram illustrating a positional relationship in a three-dimensional (3D) coordinate space between each image-capturing apparatus and a field.

FIG. 8 is a diagram illustrating a positional relationship in the 3D coordinate space between the respective positions and orientations of the image-capturing apparatuses 101 to 110 and the field 130. FIG. 8 illustrates respective 3D coordinates (X1, Y1, Z1) to (X10, Y10, Z10) of the image-capturing apparatuses 101 to 110 with the origin (0, 0, 0) of the 3D coordinates at the center of the field 130. Assume that 3D coordinates at one end on an X-axis (long side direction) of the field 130 are (Xf, 0, 0) and 3D coordinates at the other end on the X-axis of the field 130 are (−Xf, 0, 0) in FIG. 8. Similarly, assume that 3D coordinates at one end on a Y-axis (short side direction) of the field 130 are (0, Yf, 0) and 3D coordinates at the other end on the Y-axis of the field 130 are (0, −Yf, 0). The 3D coordinates on the field 130 can be acquired from the 3D coordinate information about the field 130 included in the stadium-related information held by the related information input unit 330 described above. The actual size of the field 130 can be determined from the 3D coordinate information about the field 130 and the 3D geometric model data of the stadium. The determining of the actual size of the field 130 enables grasping of the distance from each of the image-capturing apparatuses 101 to 110 to the end of the field 130 and the direction of each of the image-capturing apparatuses 101 to 110. In the case of the present exemplary embodiment, the position estimation unit 329 executes simple processing using the stadium-related information to estimate the distance from each of the image-capturing apparatuses 101 to 110 to the end of the field 130 and the direction of each of the image-capturing apparatuses 101 to 110.

Figure 9:
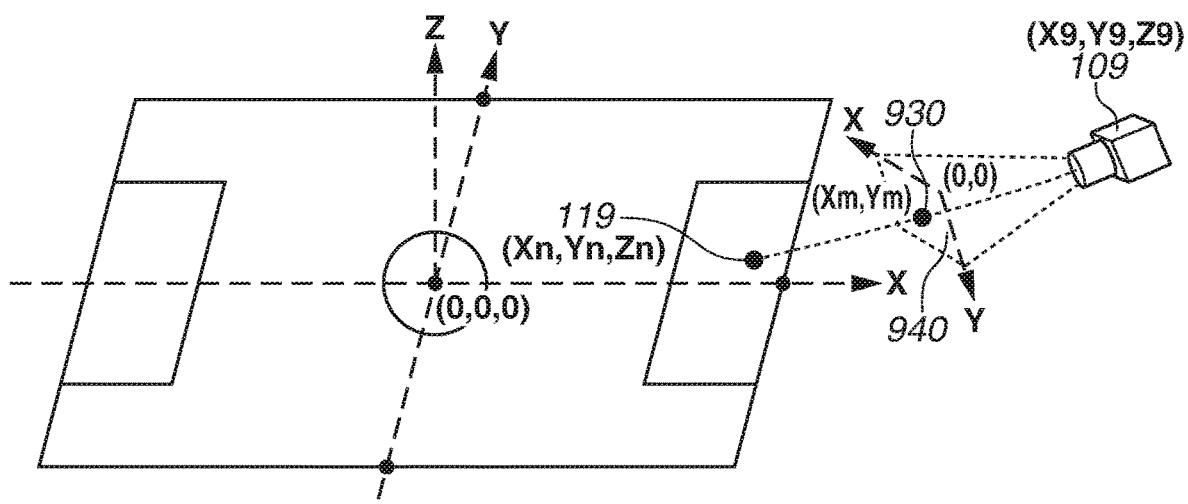
FIG. 9 is a diagram illustrating a positional relationship between coordinates on an image captured by an image-capturing apparatus and 3D coordinates.

The position estimation unit 329 also obtain mapping information between a two-dimensional (2D) coordinate system of a captured image in accordance with a zoom value of each of the image-capturing apparatuses 101 to 110 and the above-described 3D coordinate system that is common to the image-capturing apparatuses 101 to 110. The image-capturing apparatus 109 illustrated in FIGS. 8 and 9 among the image-capturing apparatuses 101 to 110 and a gaze point 119 of the image-capturing apparatus 109 are taken as an example. In this example, the position estimation unit 329 acquires 2D coordinates (Xm, Ym) of a gaze point 930 which are in the image captured by the image-capturing apparatus 109 (on sensor plane 940 of image-capturing apparatus 109) and correspond to 3D coordinates (Xn, Yn, Zn) of the gaze point 119 of the image-capturing apparatus 109.

In the present exemplary embodiment, a board on which the marker pattern registered in the marker registration unit 328 is printed is moved by a moving object, and the focus adjustment of the image-capturing apparatus is performed when the moving object enters any of the gaze point area, the front area, and the rear area. That is, the field used for a soccer game or the like has few features with which the focus adjustment of the image-capturing apparatus can be performed, so that the focus adjustment is performed using the marker pattern on the board assigned to the moving object.

Figure 10A:
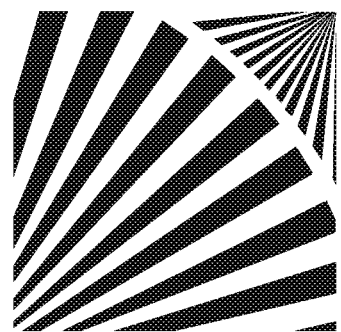
FIGS. 10A to 10C are diagrams each illustrating a marker pattern according to the first exemplary embodiment.
Figure 10B:
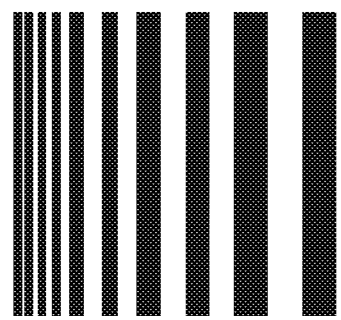
Figure 10C:
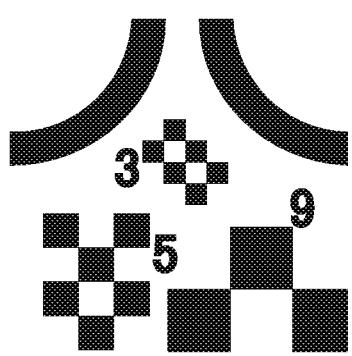

FIGS. 10A to 10C are diagrams each illustrating a specific marker pattern example. A marker pattern illustrated in FIG. 10A is an example of a marker pattern for the gaze point to be used for the focus adjustment in the gaze point area. A marker pattern illustrated in FIG. 10B is an example of a marker pattern for the front side to be used for the focus adjustment in the front area. A marker pattern illustrated in FIG. 10C is an example of a marker pattern for the rear side to be used for the focus adjustment in the rear area. The number (types) of marker patterns to be used may be more than that in this example or less than that in this example.

Figure 11:
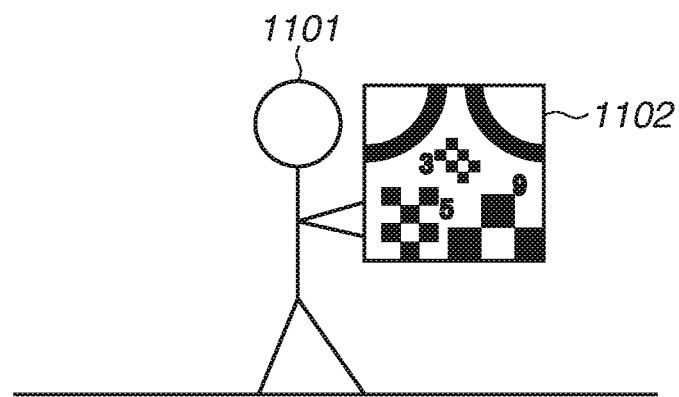
FIG. 11 is a diagram illustrating an example in which a person holds a board on which the marker pattern is printed.

In FIG. 11, a person 1101 exemplifies the moving object to which the board on which the marker patterns is printed or the like is assigned. FIG. 11 is a diagram illustrating the state of the person 1101 holding (carrying) the board on which the marker pattern is printed or the like. The moving object with the board on which the marker pattern is printed or the like is not limited to a person, and may be, for example, a vehicle and a drone. Each of the moving objects moves at a predetermined speed on the field. Other than the case of the moving object holing the board, the marker pattern may be projected on the field by, for example, a projector.

Figure 12A:
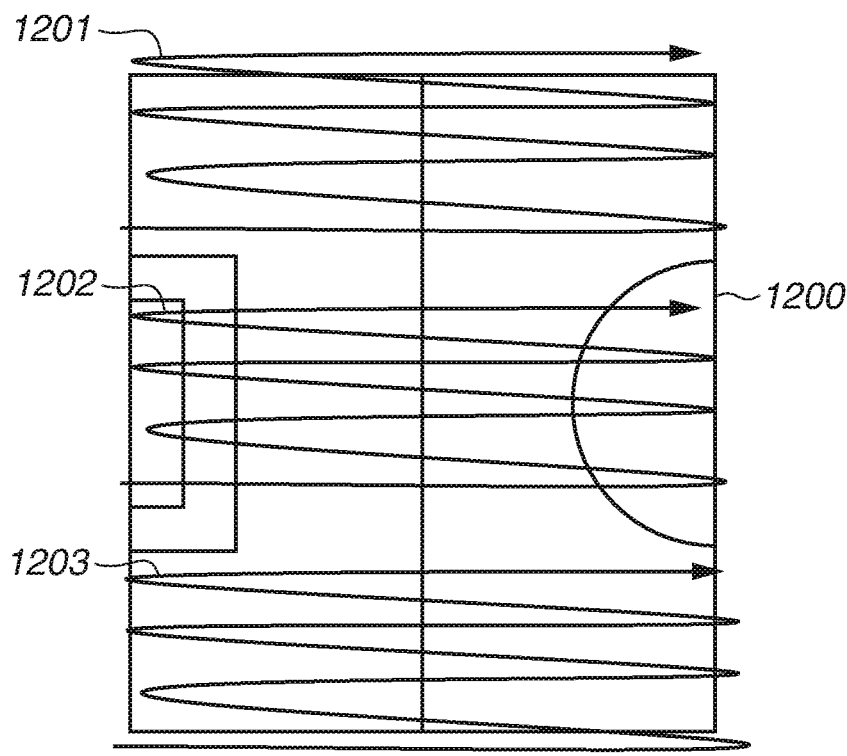
FIGS. 12A and 12B are diagrams each illustrating an example of moving the marker pattern on the field.
Figure 12B:
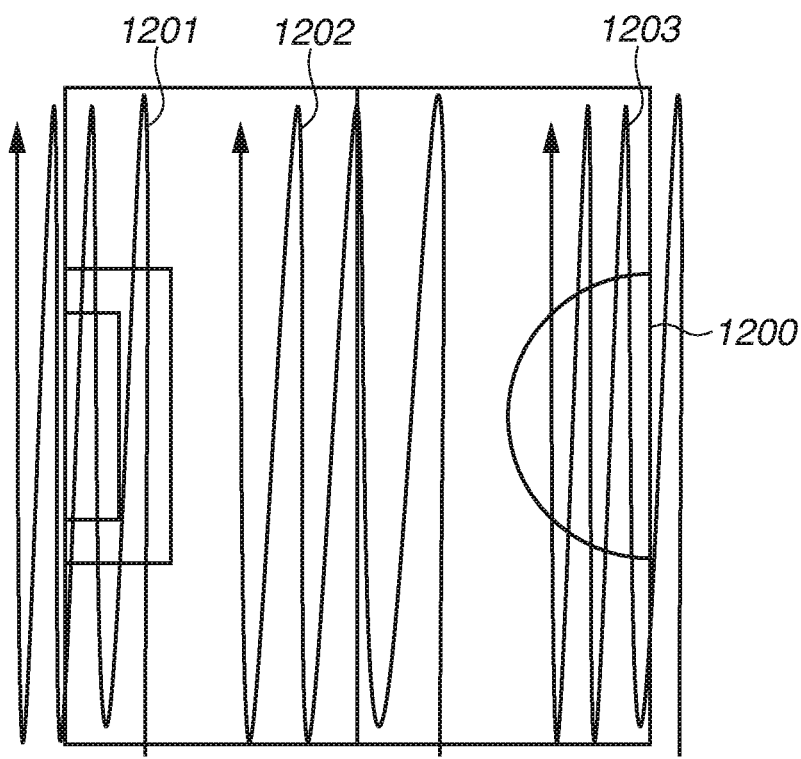

FIGS. 12A and 12B each illustrate an example of a route along which a plurality of moving objects, such as persons, for example, at least three moving objects 1201 to 1203 move on a field 1200 (field 130 in FIG. 1). For example, the moving object 1202 moves in the vicinity of the center area of the field 1200 as indicated by respective directions of arrow in FIGS. 12A and 12B, and the moving objects 1201 and 1203 move in the vicinity of the respective ends of the field 1200 as indicated by respective directions of arrow. Areas in which the moving objects 1201 to 1203 move correspond to overlapping areas of the gaze point area, the front area, and the rear area. Since the image-capturing apparatuses 101 to 110 are installed in the stadium so as to surround the field 1200, in one embodiment, each of the moving objects 1201 to 1203 move in a longitudinal direction as illustrated in FIG. 12A, and thereafter moves, for example, in a transverse direction as illustrated in FIG. 12B.

Figure 13:
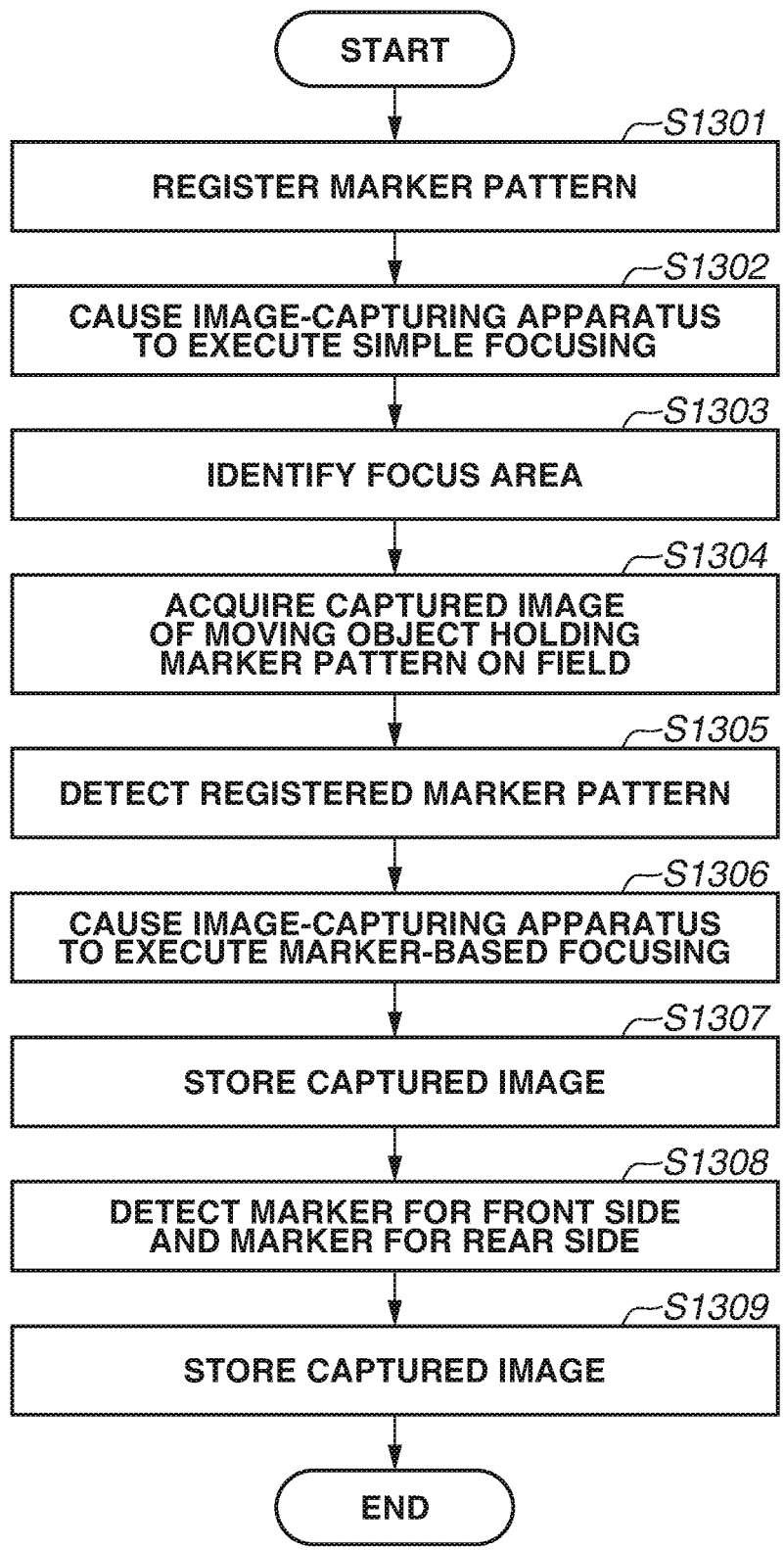
FIG. 13 is a flowchart of processing in the control unit according to the first exemplary embodiment.

FIG. 13 is a flowchart illustrating the flow of processing of the control unit 220 when one of the image-capturing apparatuses 101 to 110 executes the focus processing for the focus adjustment. Assume that the image-capturing apparatuses 101 to 110 have already been installed in the stadium, and have been set at a correct exposure.

First, as processing in step S1301, when supplied with data about one or more specific maker patterns from, for example, an external apparatus, the control unit 220 registers the one or more marker patterns in the marker registration unit 328. The one or more specific marker patterns registered in the marker registration unit 328 are used when a marker pattern corresponding to an image captured by the image-capturing apparatus is detected at a later process. The registration processing for the marker patterns may be executed before the image-capturing apparatuses 101 to 110 are installed in the stadium. While the external apparatus that supplies the marker patters to the marker registration unit 328 is not particularly limited, it is assumed to be, for example, a personal computer.

Subsequently in step S1302, the command transmission unit 323 transmits to the image-capturing apparatus a command (AF processing execution start command) to cause the image-capturing apparatus to start autofocus processing (hereinafter referred to as AF processing). The transmission of the AF processing execution start command in step S1302 is performed before operation of assigning the board on which the marker pattern is printed or the like to the moving object and causing the moving object to move on the field. The AF processing in the image-capturing apparatus at this time is executed such that the image-capturing apparatus focuses on turf on stadium, a white line, a goal, and audience seats, as an alternative to the marker pattern. The focus adjustment of the image-capturing apparatus at this time is not necessarily precise, and is to be at a level from which the marker pattern can be resolved if the marker pattern is placed on the field. The present exemplary embodiment assumes that the AF processing of the image-capturing apparatus is executed using any one of a phase difference detection method, a contrast difference detection method, and a method of the combined adoption of the phase difference detection method and the contrast difference detection method. The processing in step S1302 is executed individually and in parallel in each of the image-capturing apparatuses 101 to 110.

Subsequently in step S1303, the area identification unit 326 executes focus area identification processing for identifying an area on which the image-capturing apparatus to be focus. In the case of the present exemplary embodiment, the focus area identification processing includes processing for identifying the gaze point area, the front area, and the rear area described above as the areas to be focused on with respect to each of the image-capturing apparatuses 101 to 110.

When the processing until step S1303 ends, the processing proceeds to the next step S1304. In step S1304, the image acquisition unit 321 acquires images (i.e., images of moving image), which are consecutively captured by the image-capturing apparatuses 101 to 110, of the moving objects moving on the field in a state where the respective boards on which the respective marker patterns are printed or the like is held. Data about the images captured by the image-capturing apparatuses 101 to 110 are then transmitted to the control unit 220 through the hub 210.

In step S1305, the marker detection unit 327 detects a marker pattern that matches with the marker pattern registered in the marker registration unit 328 from the image acquired by the image acquisition unit 321 from each of the image-capturing apparatuses 101 to 110.

Assume that the marker detection unit 327 detects the marker pattern for the gaze point from the image captured by the image-capturing apparatus when the moving object holding the board with, for example, the marker pattern for the gaze point illustrated in FIG. 10A, enters the gaze point area on the field. In this case, in step S1306, the command transmission unit 323 transmits the AF processing execution start command to the image-capturing apparatus that has captured the image. Thus, the image-capturing apparatus can execute the focus processing to focus on the gaze point marker pattern on the board held by the moving object.

In the next step in S1307 after the transmission of the AF processing execution start command, the image acquisition unit 321 acquires the captured image from the image-capturing apparatus to which the AF processing execution start command has been transmitted from the command transmission unit 323. That is, the captured image that is acquired by the image acquisition unit 321 from the image-capturing apparatus is an image in which the marker pattern for the gaze point is included in the gaze point area, and that has been captured by the image-capturing apparatus with the focus adjustment of focusing on the marker pattern for the gaze point. The captured image that has been acquired by the image acquisition unit is transmitted to the storage unit 331 and stored in the storage unit 331. The image stored in the storage unit 331 is used for a user, such as an operator, to visually check whether the focus state of the image-capturing apparatus is appropriate in the gaze point area or for the control unit 220 to check this state based on, for example, a contrast of the image.

Subsequently in step S1308, the marker detection unit 327 executes detection processing of the marker pattern for the image captured by the image-capturing apparatus when the moving object enters the front area or the rear area in a manner similar to the gaze point area. For example, the marker detection unit 327 detects the marker pattern for the front side from the image captured by the image-capturing apparatus when the moving object holding the board with, for example, the marker pattern for the front side illustrated in FIG. 10B, enters the front area on the field. Similarly, for example, the marker detection unit 327 detects the marker pattern for the rear side from the image captured by the image-capturing apparatus when the moving object holding the board with, for example, the marker pattern for the rear side illustrated in FIG. 10C, enters the rear area on the field.

Subsequently in step S1309, the image acquisition unit 321 acquires the captured image from the image-capturing apparatus. The captured image that is acquired by the image acquisition unit 321 from the image-capturing apparatus is an image when the marker pattern for the front side has been detected in the front area, or an image when the marker pattern for the rear side has been detected in the rear area. The captured image that has been acquired by the image acquisition unit 321 is transmitted to the storage unit 331 and stored in the storage unit 331. The image stored in the storage unit 331 is used for the user to check whether the focus state of the image-capturing apparatus is appropriate in the front area or whether the focus state of the image-capturing apparatus is appropriate in the rear area.

That is, in the case of the present exemplary embodiment, the captured images stored in step S1307 and step S1309 are used for the user to check whether the focus state of the image-capturing apparatus is appropriate in all of the gaze point area, the front area, and the rear area.

Timings at which the marker patterns on the respective boards held by the respective moving objects enter the front area or the rear area are different from one another. Thus, the marker detection unit 327 first detects the marker pattern for the front side that has entered the front area. Thereafter, the marker detection unit 327 detects the marker pattern for the rear side that has entered the rear area. Alternatively, the opposite order is possible. Further, there may be a case where the marker pattern for the rear side enters the rear area almost simultaneously with the entry of the marker pattern for the front side in the front area. In such a case, these marker patterns can be detected simultaneously.

Figure 14:
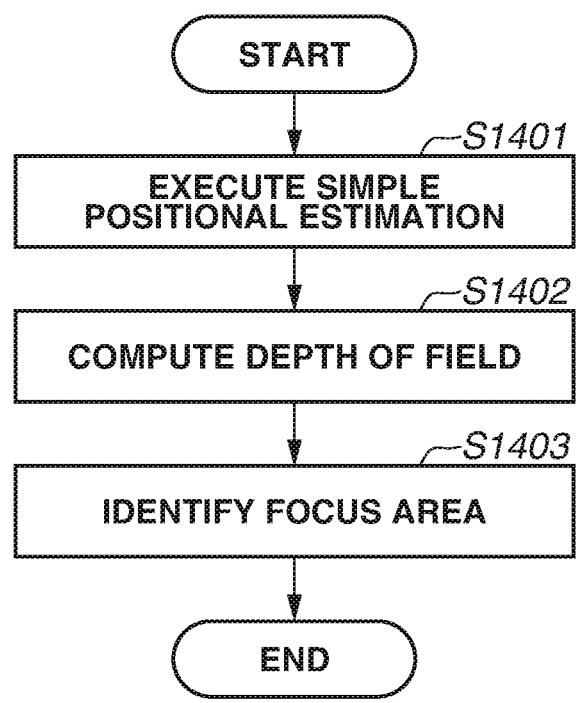
FIG. 14 is a flowchart of focus area identification processing.

FIG. 14 is a flowchart illustrating details of the focus area identification processing which is executed in step S1303 illustrated in FIG. 13.

First, in step S1401, the position estimation unit 329 acquires the images acquired by the image acquisition unit 321 from the image-capturing apparatuses 101 to 110 and the stadium-related information held by the related information input unit 330. The position estimation unit 329 then estimates a positional relationship between each of the image-capturing apparatuses 101 to 110 and the field 130, based on the image from each of the image-capturing apparatuses 101 to 110 and the stadium-related information.

Subsequently in step S1402, the depth of field computing unit 324 computes a depth of field of each of the image-capturing apparatuses 101 to 110 from a current zoom value, a distance to the gaze point, and an aperture value of each of the image-capturing apparatuses 101 to 110.

Subsequently in step S1403, the area identification unit 326 identifies the gaze point area, the front area, and the rear area with respect to each of the image-capturing apparatuses 101 to 110, based on the positional relationship estimated in step S1401 and the depth of field acquired in step S1402. The control unit 220 then causes the display device of the UI unit 260 to display the screen indicating the areas identified in step S1403 as illustrated in FIG. 7. After step S1403, the processing proceeds to step S1304 illustrated in FIG. 13.

Figure 15:
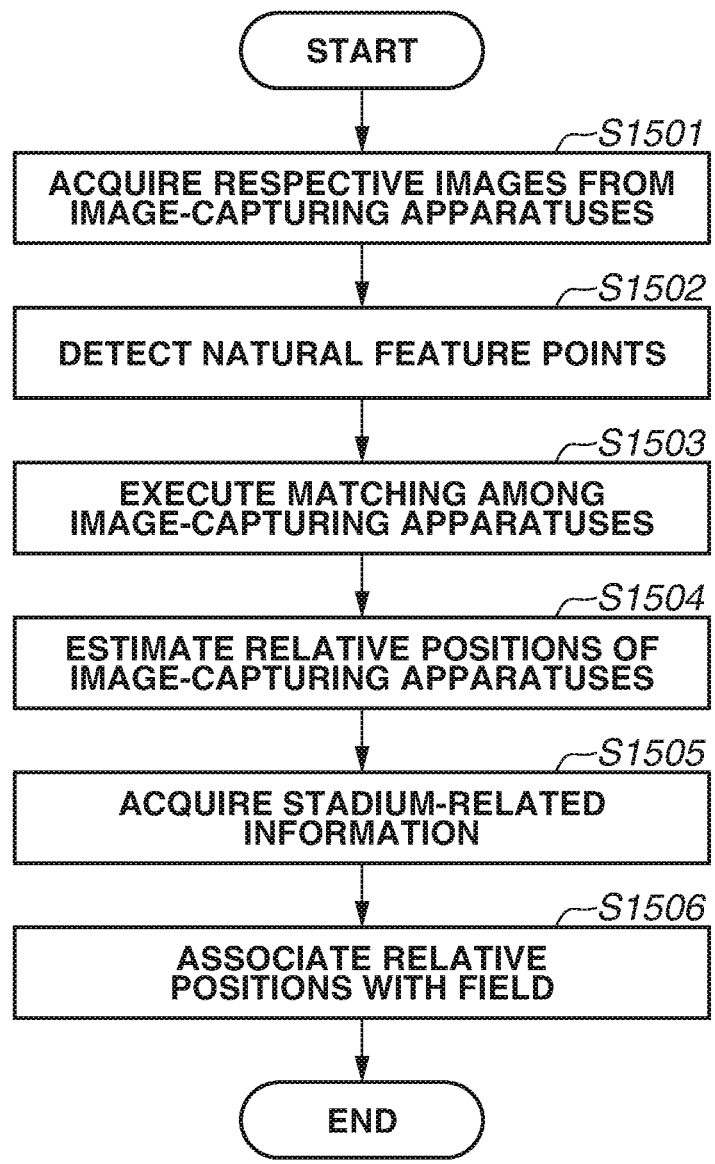
FIG. 15 is a flowchart illustrating simple position estimation processing.

FIG. 15 is a flowchart illustrating details of the simple position estimation processing executed in step S1306 illustrated in FIG. 13.

First, in step S1501, the position estimation unit 329 acquires one or more images for each of the image-capturing apparatuses 101 to 110 from the corresponding images acquired by the image acquisition unit 321 from the image-capturing apparatuses 101 to 110.

Subsequently in step S1502, the position estimation unit 329 detects natural feature points from the corresponding images from the image-capturing apparatuses 101 to 110. For example, the position estimation unit 329 detects a gradient of luminance and a change in color in the images as the natural feature points. A lot of natural feature points can be detected, for example, in portions of turf, a goal, a white line, a person, and audience seats in the images.

Subsequently in step S1503, the position estimation unit 329 executes matching processing to match the natural feature points among the respective images captured by the image-capturing apparatuses 101 to 110.

Subsequently in step S1504, the position estimation unit 329 estimates a relative position of each of the image-capturing apparatuses 101 to 110 to the other image-capturing apparatuses. That is, a result of the matching processing for the natural feature points in step S1503 may include an error. For this reason, in step S1504, the position estimation unit 329 determines a relative position of the image-capturing apparatuses 101 to 110 by minimizing the error.

Subsequently, in step S1505, the position estimation unit 329 acquires the stadium-related information from the related information input unit 330.

Thereafter, in step S1506, the position estimation unit 329 associates the relative positions of the image-capturing apparatuses 101 to 110 with the field based on the stadium-related information, and converts each of the relative positions of the image-capturing apparatuses 101 to 110 to an absolute position corresponding to the 3D coordinate space of the stadium. The position estimation unit 329 may use the 3D geometric model data to associate the relative positions of the image-capturing apparatuses 101 to 110 with the field, and may use a known 3D coordinate value on the field, if any, for the association. After step S1506, the processing proceeds to the processing in step S1304.

As described above, in the first exemplary embodiment, the focus adjustment of the image-capturing apparatus is processing to cause the image-capturing apparatus to focus on the marker pattern printed on the board held by the moving object that moves on the field. The focus adjustment of the image-capturing apparatus is performed when the marker pattern for the gaze point on the board held by the moving object enters the gaze point area. Thus, according to the first exemplary embodiment, the focus adjustment of the image-capturing apparatuses can be executed in a short period of time even if there are a lot of gaze points.

A second exemplary embodiment of the disclosure will be described below. In the present exemplary embodiment, a description will be provided of an example, in which not only the focus adjustment when each image-capturing apparatus has a different gaze point as illustrated in FIG. 1 is executed in a short period of time, but also calibration operation for acquiring the position and orientation of each image-capturing apparatus is executed in a short period of time.

Figure 16:
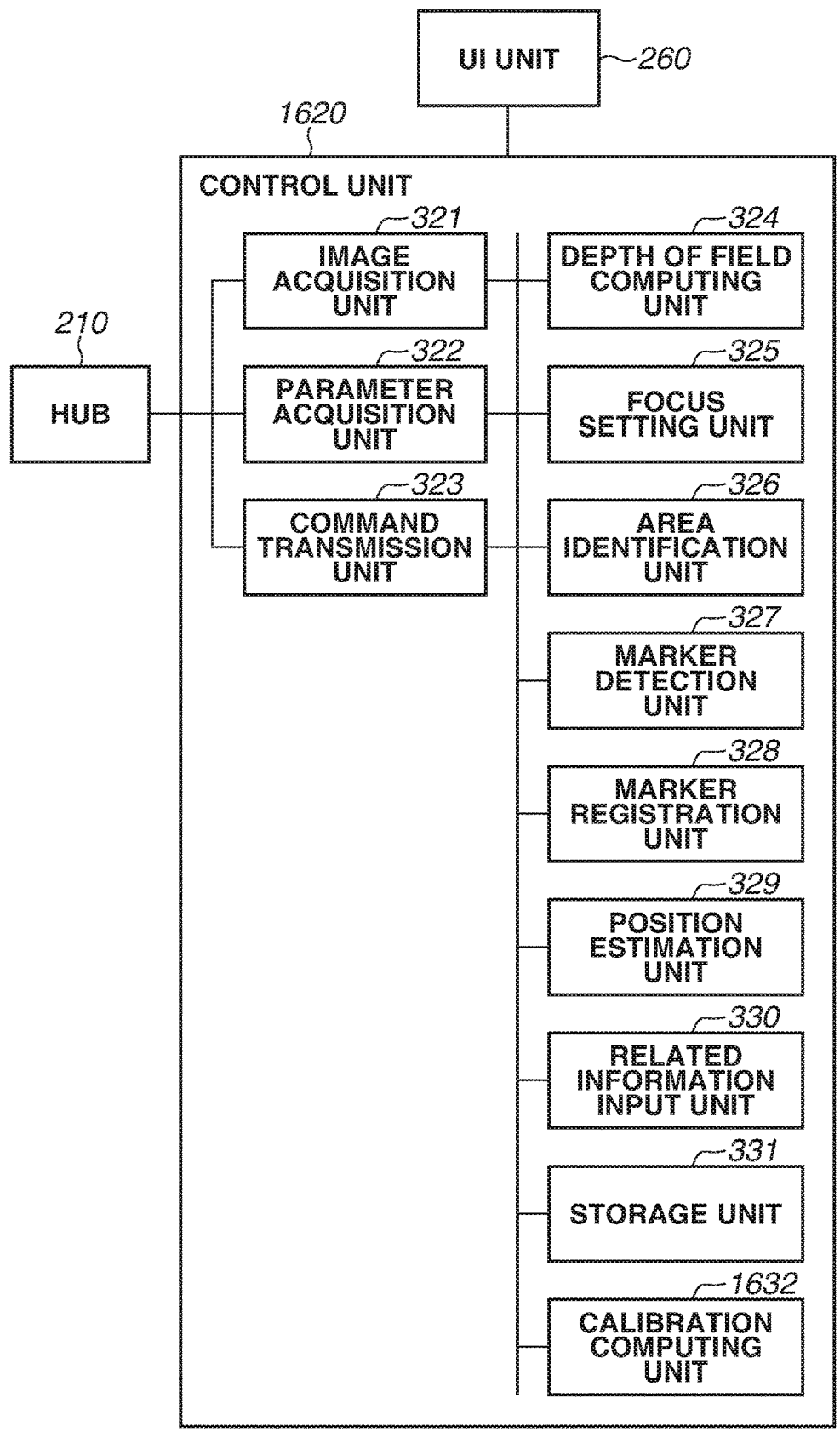
FIG. 16 is a block diagram illustrating a configuration example of a control unit according to a second exemplary embodiment.

FIG. 16 is a diagram illustrating a configuration example of a control unit 1620 according to the second exemplary embodiment. In the control unit 1620 illustrated in FIG. 16, the image acquisition unit 321 to the storage unit 331 are equivalent to the respective units denoted by the corresponding reference signs, and thus description thereof will be omitted. In the case of the second exemplary embodiment, the control unit 1620 further includes a calibration computing unit 1632. The calibration computing unit 1632 executes calibration computing processing using the respective images acquired by the image acquisition unit 321 from the image-capturing apparatuses 101 to 110 illustrated in FIG. 1.

A description will be provided below of processing of the control unit 1620 according to the second exemplary embodiment to execute calibration of the image-capturing apparatuses 101 to 110.

In the case where the virtual viewpoint image as described above is generated, the 3D geometry of the subject is restored from the images acquired by the image-capturing apparatuses 101 to 110. Thus, the position and orientation of each of the image-capturing apparatuses 101 to 110 is to be computed with high accuracy. The respective coordinates of the image-capturing apparatuses 101 to 110 are to be associated with a coordinate system common to the image-capturing apparatuses 101 to 110. Thus, the control unit 1620 according to the second exemplary embodiment acquires the position and orientation of each of the image-capturing apparatuses 101 to 110 with high accuracy and executes the calibration computing processing (camera calibration computing processing) to perform the association of the coordinate system.

In the second exemplary embodiment, marker patterns for calibration are used to effectively execute calibration of the image-capturing apparatuses. The marker patterns for calibration are, for example, printed on the respective boards, which are carried by the respective moving objects (e.g., persons) so as to move in a common field of view of the image-capturing apparatuses 101 to 110, i.e., on the field 130 illustrated in FIG. 1. The control unit 1620 detects the respective marker patterns for calibration from the respective images acquired by causing the image-capturing apparatuses 101 to 110 to perform synchronous image-capturing, and executes calibration of the image-capturing apparatuses 101 to 110 based on the respective detected marker patterns for calibration.

Figure 17:
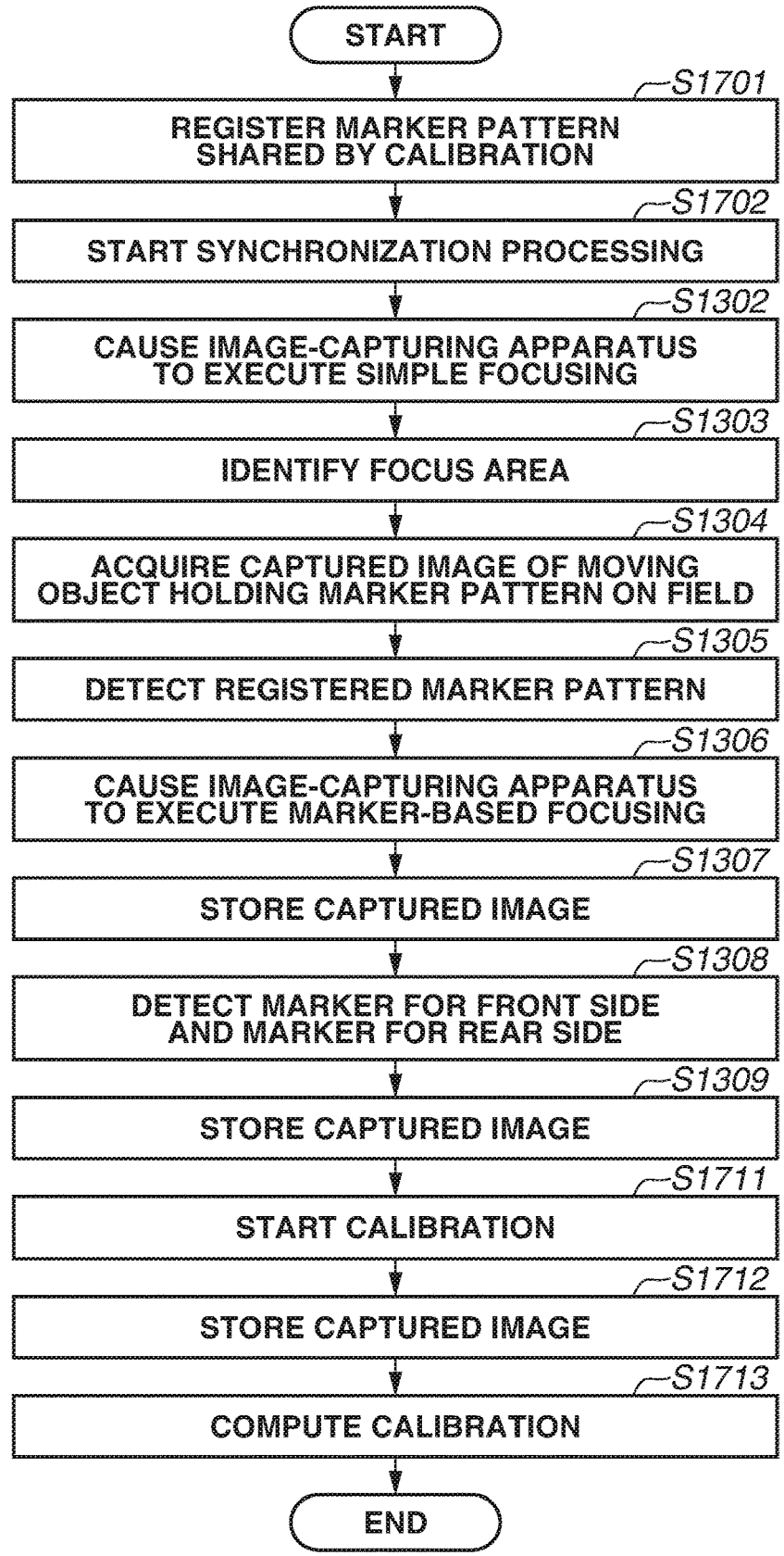
FIG. 17 is a flowchart of processing in the control unit according to the second exemplary embodiment.

FIG. 17 is a flowchart illustrating the flow of processing of the control unit 1620 according to the second exemplary embodiment in executing the focus processing and the calibration computing processing of one image-capturing apparatus. In the flowchart illustrated in FIG. 17, the operations from step S1303 to S1310 is similar to the above-described operations in respective steps denoted by the corresponding reference signs illustrated in FIG. 13, and description thereof will be omitted. Also in this example, in a manner similar to the above-described exemplary embodiment, a description will be provided on the assumption that the image-capturing apparatuses 101 to 110 have already been installed in the stadium, and have been set at a correct exposure.

First, in step S1701, when supplied with data about a maker pattern from, for example, the external apparatus, the control unit 1620 registers the marker pattern in the marker registration unit 328. While the marker patterns registered in the marker registration unit 328 are used to detect the marker patterns from the respective captured images from the image-capturing apparatuses in a later process, the marker patterns according to the second exemplary embodiment include the patterns for calibration. The registration processing of the marker patterns may be executed before the image-capturing apparatuses 101 to 110 are installed in the stadium.

Figure 18A:
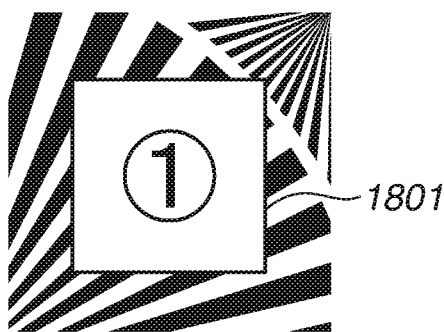
FIGS. 18A to 18F are diagrams each illustrating a marker pattern according to the second exemplary embodiment.
Figure 18B:
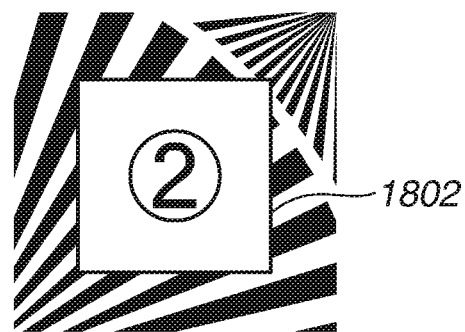
Figure 18C:
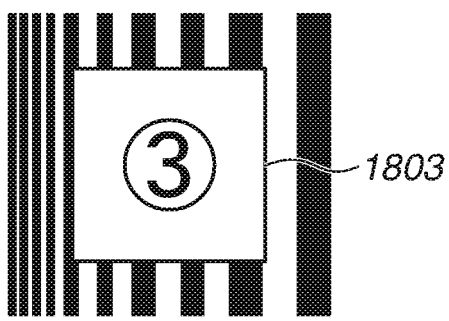
Figure 18D:
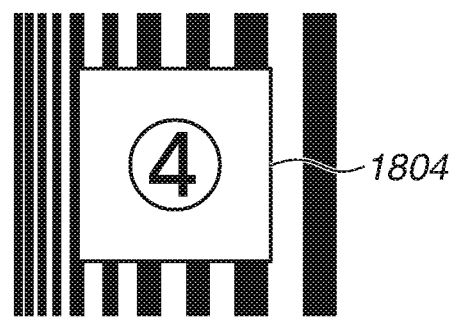
Figure 18E:
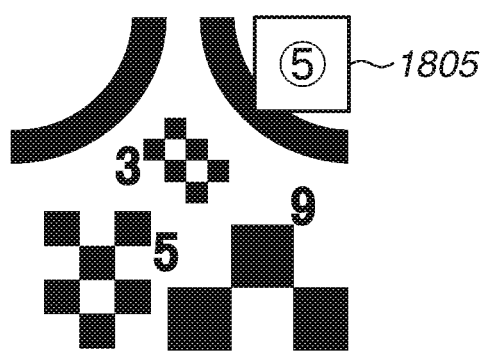
Figure 18F:
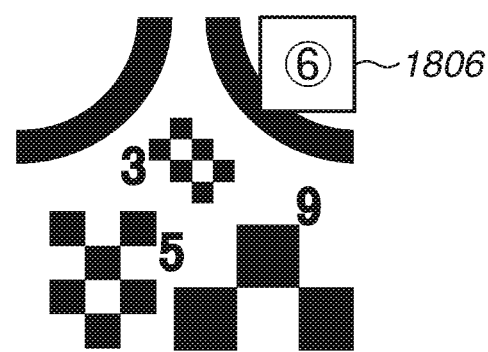

FIGS. 18A to 18F are diagrams each illustrating a specific marker pattern example according to the second exemplary embodiment. Marker patterns illustrated in FIGS. 18A and 18B are the marker patterns for the gaze point used in the gaze point area as in the first exemplary embodiment, and also used as the marker patterns for calibration. The marker pattern illustrated in FIG. 18A is configured such that a marker identification (ID) 1801 for calibration is superimposed on (added to) the marker pattern illustrated in FIG. 10A. The marker pattern illustrated in FIG. 18B is configured such that a marker ID 1802 for calibration is superimposed on (added to) the marker pattern illustrated in FIG. 10A. Similarly, a marker pattern illustrated in FIG. 18C is configured such that a marker ID 1803 for calibration is superimposed on the marker pattern for the front side described above, and a marker pattern illustrated in FIG. 18D is configured such that a marker ID 1804 for calibration is superimposed on the marker pattern for the front side. Similarly, a marker pattern illustrated in FIG. 18E is configured such that a marker ID 1805 for calibration is superimposed on the marker pattern for the rear side described above, and a marker pattern illustrated in FIG. 18F is configured such that a marker ID 1806 for calibration is superimposed on the marker pattern for the rear side. The number (types) of marker patterns to be used may be more than that in this example or less than that in this example.

Subsequently, in step S1702, the command transmission unit 323 transmits to the image-capturing apparatuses 101 to 110 to instruct the image-capturing apparatuses 101 to 110 to start synchronous image-capturing. Accordingly, the image-capturing apparatuses 101 to 110 perform synchronous image-capturing. The reason that the image-capturing apparatuses are caused to perform the synchronous image-capturing in step S1702 is to execute the matching processing using the marker pattern with the identical marker ID and the natural feature points among images that are time-synchronous in the calibration computing processing in a later process. The operations in subsequent steps S1302 to S1309 is similar to those in the above-described flowchart in FIG. 13, and after step S1309, the processing proceeds to step S1711.

Subsequently, in step S1711, the command transmission unit 323 transmits to the image-capturing apparatuses 101 to 110 commands that instruct the image-capturing apparatuses 101 to 110 to keep the synchronous image-capturing and start to capture images to be used for the calibration computing. Accordingly, the image-capturing apparatuses 101 to 110 perform image-capturing of time-synchronous images (images used for calibration computing).

Subsequently in step S1712, the image acquisition unit 321 acquires the time-synchronous images that are synchronously captured by the image-capturing apparatus 101 to 110. The storage unit 331 stores the time-synchronous images in association with the respective image-capturing apparatuses.

Subsequently in step S1713, the calibration computing unit 1632 detects an image with the marker pattern for calibration from each of the time-synchronous images stored in the storage unit 331. As described above, the marker pattern for calibration includes the marker ID. Thus, by detecting the marker ID from the image stored in the storage unit 331, the calibration computing unit 1632 can identify the image as the image for the calibration computing. The calibration computing unit 1632 executes the matching processing using the marker pattern with the identical marker ID and the natural feature points among the time-synchronous images, and executes the calibration computing processing by detecting the marker pattern for calibration. The method for executing the calibration computing with respect to a plurality of image-capturing apparatuses using the specific marker pattern such as the marker pattern for calibration is a known technique, and thus description thereof will be omitted.

As described above, the second exemplary embodiment enables execution of the focus adjustment of the image-capturing apparatuses 101 to 110 as in the first exemplary embodiment, and also enables execution of the calibration of the image-capturing apparatuses 101 to 110. The second exemplary embodiment achieves reduction in time in the focus adjustment as well as the calibration processing by providing commonality between the marker pattern for the focus adjustment and the marker pattern for the calibration computing, and causing the image-capturing apparatuses 101 to 110 to perform the synchronous image-capturing.

FIG. 19 is a diagram illustrating a hardware configuration example of an information processing apparatus 1900 as an application example of the above-described exemplary embodiments. The information processing apparatus 1900 is, for example, a personal computer. The information processing apparatus 1900 illustrated in FIG. 19 includes a central processing unit (CPU) 1911, a read-only memory (ROM) 1912, a random-access memory (RAM) 1913, an auxiliary storage device 1914, a display unit 1915, and operation unit 1916, a communication interface (I/F) 1917, and a bus 1918. The bus 1918 connects the units of the information processing apparatus 1900 and transmits information to the units.

The CPU 1911 controls the whole of the information processing apparatus 1900 using a computer program and data stored in the ROM 1912 and the RAM 1913. The CPU 1911 can execute processing of the control unit 220, the virtual viewpoint image generation unit 230, the virtual viewpoint generation unit 240, and the UI unit 260 described above using the program and data according to the exemplary embodiments described above. The information processing apparatus 1900 includes one or more dedicated hardware devices different from the CPU 1911, and the dedicated hardware device may execute at least part of the processing executed by the CPU 1911. Examples of the dedicated hardware device include an application-specific integrated circuit (ASIC), a field-programmable gate array (FPGA), and a digital signal processor (DSP). The ROM 1912 stores a program or the like that does not need to be changed. The RAM 1913 temporarily stores a program and data supplied from the auxiliary storage device 1914, and data supplied from the outside through the communication I/F 1917. The auxiliary storage device 1914 includes, for example, a hard disk drive, and stores a variety of data, such as image data and audio data.

The display unit 1915 includes, for example, a display device, such as a liquid crystal display and an a light emitting diode (LED) display, and displays, for example, a graphical user interface (GUI) for the user, such as the operator, to operate the information processing apparatus 1900 and images captured by the image-capturing apparatuses on a screen. The operation unit 1916 includes, for example, a keyboard, a mouse, a joy stick, a touch panel, and inputs a variety of instructions in response to the user's operation to the CPU 1911. The display unit 1915 and the operation unit 1916 are included in the UI unit 260 described above.

While the display unit 1915 and the operation unit 1916 are incorporated in the information processing apparatus 1900 in this example, at least one of the display unit 1915 and the operation unit 1916 may be provided as a separate device outside the information processing apparatus 1900. In such a case, the CPU 1911 may operate as a display control unit that controls the display unit 1915 and as an operation control unit that controls the operation unit 1916.

The communication I/F 1917 is used for communication with an external apparatus outside the information processing apparatus 1900. For example, in a case where the information processing apparatus 1900 has wired connection to the external apparatus, a cable for communication is connected to the communication I/F 1917. In a case where the information processing apparatus 1900 has the function of wirelessly communicating with the external apparatus, the communication I/F 1917 is provided with an antenna. The information processing apparatus 1900 can communicate with the image-capturing apparatuses 101 to 110 through the communication I/F 1917 and the hub 210 described above. With this configuration, the CPU 1911 can control, for example, operation and settings of the image-capturing apparatuses 101 to 110.

Processing executed by, for example, the control unit 220 and the virtual viewpoint image generation unit 230, among the units of the control apparatus 200 described above, may be processing to which artificial intelligence (AI) is applied. For example, a trained model trained through machine learning may be used in substitution for these units. In such a case, a plurality of combinations of input data and output data to and from these units is prepared as training data, and the trained model, which has acquired knowledge through machine-learning from the combinations and outputs data with respect to input data as a result based on the acquired knowledge, is generated. The trained model can be configured using a neural network model, for example. The trained model, which serves as a program for executing the processing in an equivalent manner to the above-described units, executes the processing of the respective units in collaboration with the CPU, the GPU, and the like. Such a trained model can be updated or the like as necessary every time a certain amount of data is processed.

A program that achieves one or more functions in the control processing according to the exemplary embodiments of the disclosure can be supplied to a system or an apparatus through a network or a storage media, and can be achieved by being loaded and executed by one or more processors in the system or a computer of the apparatus.

The exemplary embodiments described above are mere concrete examples of implementing the disclosure, and the technical scope of the disclosure should not be interpreted in a limited manner by the exemplary embodiments. That is, the disclosure can be implemented in various modes without departing from the technical idea or the principal features of the disclosure.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure enables execution of the focus adjustment of an image-capturing apparatus in a short period of time.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146278, filed Aug. 8, 2019, which is hereby incorporated by reference herein in its entirety.

What is claimed is:

1. A control apparatus configured to control an image-capturing apparatus, the control apparatus comprising:
   one or more memories storing instructions; and
   one or more processors executing the instructions to:
   specify an area to be focused by the image-capturing apparatus in an image-capturing target area captured by a plurality of image-capturing apparatuses including the image-capturing apparatus;
   detect a specific marker pattern from an image acquired the image-capturing apparatus, the specific marker pattern being moved in the image-capturing target area captured by the plurality of image-capturing apparatuses; and
   execute focus adjustment of the image-capturing apparatus using the specific marker pattern, based on the detection of the specific marker pattern from an image of the area that is to be focused by the image-capturing apparatus and has been specified in the acquired image.

2. The control apparatus according to claim 1, further comprising a storage device configured to store the acquired image and information about a state of the image-capturing apparatus when the focus adjustment is executed.

3. The control apparatus according to claim 2,
   wherein the acquired image includes the specific marker pattern in the area that is to be focused by the image-capturing apparatus.

4. The control apparatus according to claim 2,
   wherein the storage device stores the acquired image including the specific marker pattern in the area that is to be focused by the image-capturing apparatus and another image including another marker pattern in another area that is to be focused by the image-capturing apparatus.

5. The control apparatus according to claim 1, wherein the focus adjustment is executed for each of the plurality of image-capturing apparatuses arranged such that each group including one or more of the image-capturing apparatuses has a gaze point.

6. The control apparatus according to claim 1, wherein the area to be focused by the image-capturing apparatus is identified based on an image captured by the image-capturing apparatus and a relative positional relationship between the image-capturing apparatus and the image-capturing target area.

7. The control apparatus according to claim 6, wherein the area to be focused by the image-capturing apparatus; is specified based on an in-focus range that is determined by a distance from the image-capturing apparatus to a subject and an amount of blur produced by a lens included in the image-capturing apparatus, and on an in-focus guarantee area in which an in-focus state of the image-capturing apparatus is to be guaranteed for generation of an image using the captured image.

8. The control apparatus according to claim 1,
   wherein the specific marker pattern is assigned to a moving object that moves in the image-capturing target area, and wherein the specific marker pattern is detected from an image of the moving object that appears in an image captured in the image-capturing target area by the image-capturing apparatus.

9. The control apparatus according to claim 8, wherein the specific marker pattern is detected from an image of one of one or more moving objects appearing in the image captured in the image-capturing target area by the image-capturing apparatus.

10. The control apparatus according to claim 1,
wherein the area to be focused by the image-capturing apparatus includes a plurality of areas, and
wherein the focus adjustment of the image-capturing apparatus is executed in response to the detection of the specific marker pattern from an image of one of the plurality of areas that is to be focused by the image-capturing apparatus and has been identified in the acquired image.

11. The control apparatus according to claim 1, wherein the specific marker pattern includes a pattern for calibration to acquire a position and orientation of the image-capturing apparatus.

12. The control apparatus according to claim 1,
wherein the one or more processors further execute the instructions to perform focus adjustment of the image-capturing apparatus using a still object in the area that is to be focused by the image-capturing apparatus, before the detection of the specific marker pattern.

13. The control apparatus according to claim 1,
wherein the focus adjustment is executed for each of the plurality of image-capturing apparatuses, each of the plurality of image-capturing apparatuses being pointed to one of plurality of gaze points.

14. A control method comprising:
specifying an area to be focused by an image-capturing apparatus in an image-capturing target area captured by a plurality of image-capturing apparatuses including the image-capturing apparatus;
detecting a specific marker pattern from an image acquired by the image-capturing apparatus, the specific marker pattern being moved in the image-capturing target area captured by the plurality of image-capturing apparatuses; and
executing focus adjustment of the image-capturing apparatus using the specific marker pattern, based on the detection of the specific marker pattern from an image of the specified area to be focused by the image-capturing apparatus in the acquired image.

15. The control method according to claim 14, further comprising storing the acquired image and information about a state of the image-capturing apparatus when the focus adjustment is executed.

16. The control method according to claim 14, further comprising executing the focus adjustment for each of the plurality of image-capturing apparatuses arranged such that each group including one or more of the image-capturing apparatuses has a gaze point.

17. The control method according to claim 14, wherein the area to be focused by the image-capturing apparatus is specified based on an image captured by the image-capturing apparatus and a relative positional relationship between the image-capturing apparatus and the image-capturing target area.

18. The control method according to claim 14,
wherein the specific marker pattern is assigned to a moving object that moves in the image-capturing target area, and
wherein the specific marker pattern is detected from an image of the moving object that appears in an image captured in the image-capturing target area by the image-capturing apparatus.

19. A non-transitory computer-readable recording medium configured to store a program that causes a computer to execute a control method comprising:
specifying an area to be focused by an image-capturing apparatus in an image-capturing target area captured by a plurality of image-capturing apparatuses including the image-capturing apparatus;
detecting a specific marker pattern from an image acquired by the image-capturing apparatus, the specific marker pattern being moved in the image-capturing target area captured by the plurality of image-capturing apparatuses; and
executing focus adjustment of the image-capturing apparatus using the specific marker pattern, based on the detection of the specific marker pattern from an image of the specified area to be focused by the image-capturing apparatus in the acquired image.

20. The non-transitory computer-readable recording medium according to claim 19, further comprising storing the acquired image and information about a state of the image-capturing apparatus when the focus adjustment is executed.

21. The non-transitory computer-readable recording medium according to claim 19, further comprising specifying the area to be focused by the image-capturing apparatus based on an image captured by the image-capturing apparatus and a relative positional relationship between the image-capturing apparatus and the image-capturing target area.

* * * * *